(12) United States Patent
Nishimura et al.

(10) Patent No.: US 7,691,459 B2
(45) Date of Patent: Apr. 6, 2010

(54) INORGANIC FINE PARTICLE-CONTAINING COMPOSITION, OPTICAL FILM, ANTIREFLECTION FILM AND POLARIZING FILM, AND POLARIZING PLATE AND DISPLAY DEVICE USING THE SAME

(75) Inventors: Hirokazu Nishimura, Minami-Ashigara (JP); Yasuhiro Okamoto, Minami-Ashigara (JP); Hiroyuki Yoneyama, Minami-Ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 643 days.

(21) Appl. No.: 11/385,682

(22) Filed: Mar. 22, 2006

(65) Prior Publication Data
US 2006/0216438 A1     Sep. 28, 2006

(30) Foreign Application Priority Data
Mar. 22, 2005   (JP)  .............................. 2005-082210

(51) Int. Cl.
G02F 1/1335     (2006.01)
(52) U.S. Cl. ...................... 428/1.32; 428/1.52; 428/1.6; 428/331; 428/405; 349/96; 349/137
(58) Field of Classification Search .................. 428/1.1, 428/1.3, 1.31, 1.32, 1.5, 323, 330–333, 340, 428/343, 1.52, 403–404; 349/96, 122, 137; 359/599
See application file for complete search history.

(56) References Cited

U.S. PATENT DOCUMENTS

| | | | | |
|---|---|---|---|---|
| 5,035,803 | A * | 7/1991 | Cohen | 210/656 |
| 5,045,574 | A * | 9/1991 | Kuwata et al. | 523/212 |
| 5,494,949 | A * | 2/1996 | Kinkel et al. | 523/212 |
| 2003/0031438 | A1* | 2/2003 | Kambe et al. | 385/122 |
| 2003/0100631 | A1* | 5/2003 | Barthel et al. | 523/216 |
| 2003/0171476 | A1* | 9/2003 | Li et al. | 524/492 |
| 2005/0154086 | A1* | 7/2005 | Yoneyama | 523/213 |
| 2005/0207016 | A1* | 9/2005 | Ando | 359/586 |
| 2006/0057307 | A1* | 3/2006 | Matsunaga et al. | 428/1.31 |
| 2006/0204655 | A1* | 9/2006 | Takahashi | 427/180 |

FOREIGN PATENT DOCUMENTS

| | | |
|---|---|---|
| JP | 2000-009908 A | 1/2000 |
| JP | 2001-100013 A | 4/2001 |
| JP | 2001-272502 A | 10/2001 |
| JP | 2001-310423 A | 11/2001 |
| JP | 2001-327917 A | 11/2001 |
| WO | WO 2004/017105 A1 * | 2/2004 |
| WO | WO 2004017105 A1 * | 2/2004 |
| WO | WO 2005026789 A1 * | 3/2005 |

OTHER PUBLICATIONS

Derwent 2004-634962 listing US 20060204655A1 as US equivalent of WO2004/070436A1, Takahashi, Aug. 19, 2004.*

* cited by examiner

*Primary Examiner*—Sophie Hon
(74) *Attorney, Agent, or Firm*—Buchanan Ingersoll & Rooney PC

(57) ABSTRACT

An inorganic fine particle-containing composition comprising a silylation-treated inorganic oxide fine particle, which comprises 1.4 or more silyl groups per a surface area of 1 $nm^2$ of the inorganic oxide fine particle.

7 Claims, No Drawings

INORGANIC FINE PARTICLE-CONTAINING COMPOSITION, OPTICAL FILM, ANTIREFLECTION FILM AND POLARIZING FILM, AND POLARIZING PLATE AND DISPLAY DEVICE USING THE SAME

BACKGROUND OF THE INVENTION

1. Field of the Invention

The present invention relates to an inorganic fine particle-containing composition, an optical film, an antireflection film excellent in the antireflectivity and visibility, and a polarizing plate and a polarizing film using the same, suitably usable for a display device such as liquid crystal display, plasma display and CRT, particularly for a liquid crystal display.

2. Description of the Related Art

In a display device such as cathode ray tube display device (CRT), plasma display panel (PDP), electroluminescence display (ELD) and liquid crystal display device (LCD), an antireflection film is generally disposed on the outermost surface of the display for preventing reduction in contrast due to reflection of outside light or projection of an image and reducing the reflectance by using the principle of optical interference.

Such an antireflection film can be produced by forming a low refractive index layer having an appropriate thickness on the outermost surface and depending on the case, appropriately forming a high refractive index layer, a medium refractive index layer, a hard coat layer, an antiglare layer, an antistatic layer, a light-diffusing layer and the like between the support and the low refractive index layer. In order to realize a low reflectance, the material for the low refractive index layer is demanded to have a refractive index as low as possible. Furthermore, since the antireflection film is used on the outermost surface of a display, high scratch resistance is required. For realizing high scratch resistance of a thin film having a thickness of around 100 nm, strength of the film itself is necessary.

The refractive index of a material may be decreased by using a fluorine-containing polymer as the binder resin, but this tends to impair the film strength and decrease the scratch resistance. Thus, it has been difficult to satisfy both low refractive index and high scratch resistance at the same time.

A technique of incorporating an appropriate amount of an inorganic oxide fine particle into the low refractive index layer comprising a fluorine-containing polymer to increase the hardness of the film surface and improve the scratch resistance has been proposed. This technique is effective in reducing the reflectance and improving the scratch resistance but has a problem that aggregation of inorganic oxide fine particles occurs in the low refractive index layer and the film surface state changes for the worse.

For more reducing the reflectance or projection of an image or imparting hard coat property or dust resistance, a high refractive index layer, a medium refractive index layer, an antiglare layer, a hard coat layer, an antistatic layer and the like are sometimes appropriately formed between the low refractive index layer and the support. In general, a method of incorporating an inorganic oxide fine particle into a layer is employed as means, for example, for adjusting the refractive index of the layer, forming irregularities on the layer surface, increasing the layer hardness or imparting electrical conductivity. However, similarly to the above, there is a problem that aggregation of inorganic oxide fine particles occurs in the layer and the film surface state changes for the worse.

In order not to allow for aggregation of inorganic oxide fine particles in an organic solvent, it is generally important that the inorganic oxide fine particles are stably dispersed in the organic solvent. More specifically, the control of hydrophilicity/hydrophobicity or steric hindrance on the surface of the inorganic oxide fine particle is important and a technique of surface-treating the inorganic oxide fine particle by using an alkoxysilane is known. For example, a method of dispersing an inorganic particle in an organic solvent by using a silane coupling agent is described in *Ganryo Bunsan Gijutsu Hyoumenshori to Bunsanzai no Tsukaikata oyobi Bunsansei Hyoka (Pigment Dispersion Technology How to Use Surface Treatment and Dispersant and Evaluation of Dispersibility)*, Gijutsu Joho Kyokai (compiler) (1999). Also, JP-A-2000-9908 (page 3), JP-A-2001-310423 (page 3) and JP-A-2001-100013 (page 3) disclose that when the inorganic fine particle is previously surface-treated, the scratch resistance or layer strength is improved. Furthermore, JP-A-2001-272502 (page 3) describes the effect on storage stability against aggregation of the inorganic fine particle in a coating solution. However, in the drying process of forming an optical functional layer after coating a coating solution for the formation of an optical functional layer containing an inorganic oxide fine particle, the organic solvent volatilizes to increase the concentration of the inorganic oxide fine particle and accelerate the aggregation. These techniques are still insufficient in the light of stability of the particle dispersion in the optical functional layer formed.

On the other hand, as mechanical means for improving the dispersibility, there is known a method of applying an ultrasonic treatment to a solution having dispersed therein fine particles, and then coating and drying the liquid dispersion to form a functional fine particle-containing layer (JP-A-2001-327917 (pages 4 and 5)). This method is surely effective for improving the dispersibility in a liquid dispersion before coating but has almost no effect in the light of improving the fine particle dispersibility in the formed layer, because similarly to the above, the organic solvent volatilizes in the drying process and the concentration of the inorganic oxide fine particle is increased.

SUMMARY OF THE INVENTION

The present inventors have found that in the drying process of forming an optical functional layer after coating a coating solution for the formation of an optical functional layer containing an inorganic oxide fine particle on a transparent support, aggregation of inorganic oxide fine particles occurs and this gives rise to a problem of poor film surface state.

An object of the present invention is to provide a stable composition containing an inorganic oxide fine particle, in which the dispersibility of the inorganic oxide fine particle is improved.

Another object of the present invention is to provide an optical film improved in the dispersibility of inorganic oxide fine particles without impairing the performance such as reflectance and scratch resistance, free from worsening of the film surface state due to aggregation of inorganic oxide fine particles, and assured of good production efficiency.

Another object of the present invention is to provide an antireflection film excellent in the antireflectivity and visibility.

Another object of the present invention is to provide a polarizing plate using the optical film or the antireflection film and to provide a display device reduced in the reflection of outside light and projection of surrounding scene and assured of very high visibility.

The present inventions are as follows:

1. An inorganic fine particle-containing composition comprising a silylation-treated inorganic oxide fine particle, which comprises 1.4 or more silyl groups per a surface area of 1 nm² of the inorganic oxide fine particle.

2. The inorganic fine particle-containing composition as described in item 1, wherein the silylation-treated inorganic oxide fine particle mainly comprises at least one oxide selected from silicon dioxide, tin oxide, indium oxide, zinc-oxide, zirconium oxide and titanium oxide.

3. The inorganic fine particle-containing composition as described in item 1 or 2, wherein the silylation-treated inorganic oxide fine particle has a particle diameter of from 3 to 200 nm.

4. The inorganic fine particle-containing composition as described in any one of items 1 to 3, wherein the silylation-treated inorganic oxide fine particle is a inorganic oxide fine particle silylation-treated with a compound represented by formula (I):

$$R^{10}{}_m Si(X)_{4-m} \qquad \text{Formula (I)}$$

(wherein $R^{10}$ represents a substituted or unsubstituted alkyl group or a substituted or unsubstituted aryl group, X represents a hydroxyl group or a hydrolyzable group, and m represents an integer of 1 to 3).

5. A transparent film which is obtained by using the inorganic fine particle-containing composition described in items 1 to 4.

6. An optical film comprising: a transparent support; and at least one optical functional layer, wherein at least one of said at least one optical functional layer is formed by using the inorganic fine particle-containing composition described in any one of items 1 to 4.

7. The optical film as described in item 6, wherein at least one of said at least one optical functional layer comprises a compound containing a fluorocarbon or a dimethylsiloxane.

8. The optical film as described in item 6 or 7, wherein the transparent support is the transparent film described in item 5.

9. An antireflection film which is an optical film described in items 6 to 8, wherein said at least one optical functional layer comprises a low refractive index layer.

10. The antireflection film as described in item 9, wherein said at least one optical layer further comprises at least one hard coat layer.

11. The antireflection film as described in item 10, wherein said at least one hard coat layer comprises an inorganic oxide fine particle having a particle diameter of 3 to 3,000 nm.

12. A polarizing plate comprising: a polarizer, and two protective films sandwiching the polarizer, wherein one of the two protective films is the transparent film described in item 5.

13. A polarizing plate comprising: a polarizer, and two protective films sandwiching the polarizer, wherein one of the protective films is the optical film described in any one of items 6 to 8 or the antireflection film described in any one of items 9 to 11.

14. A polarizing plate comprising: a polarizer; and two protective films sandwiching the polarizer, wherein one of the two protective films is the transparent film described in item 5 and the other one of the two protective films is the optical film described in any one of items 6 to 8 or the antireflection film described in any one of items 9 to 11.

15. A display device comprising the polarizing plate described in any one of items 12 to 14.

16. A display device comprising the optical film described in any one of items 6 to 8 or the antireflection film described in any one of items 9 to 11

DETAILED DESCRIPTION OF THE INVENTION

The present invention is described in detail below. In the present invention, when a numerical value denotes a physical property value, a characteristic value or the like, the term "from (numerical value 1) to (numerical value 2)" means "(numerical value 1) or more and (numerical value 2) or less".

The present invention relates to an inorganic fine particle-containing composition comprising a silylation-treated inorganic oxide fine particle, which comprises 1.4 or more silyl groups per the surface area of 1 nm² of the inorganic oxide fine particle.

Also, the present invention relates to a transparent film which comprises the inorganic fine particle-containing composition.

Furthermore, the present invention relates to an optical film comprising a transparent support having thereon an optical functional layer, wherein the optical functional layer is formed by using the inorganic fine particle-containing composition.

The transparent film and the transparent support which is the support of the above-described optical film may comprise a single layer or a plurality of layers and may be formed by drum casting or band casting or by the coating on a transparent support. The optical film may have a plurality of optical functional layers.

The coating solution for the formation of the optical functional layer appropriately contains a fine particle for the purpose of, for example, imparting hard coat property or scratch resistance, adjusting the refractive index or imparting electrical conductivity or surface irregularities, and the fine particle is preferably an inorganic oxide fine particle in view of high strength, selection range of refractive index, electrical conductivity, colorlessness and the like. The inorganic oxide fine particle in the coating solution for the formation of the optical functional layer preferably undergoes no aggregation and is stably dispersed. Furthermore, from the standpoint of producing an optical film with good production efficiency without impairing the film surface state of the optical film, it is important that the inorganic oxide fine particle does not undergo aggregation even when the fine particle concentration is increased in the drying process due to volatilization of an organic solvent after the coating solution is coated.

In order to achieve stable dispersion of the inorganic oxide fine particle in an organic solvent, the fine particle surface needs to be hydrophobed. As for the hydrophobing treatment, a method of esterifying the hydroxyl group on the fine particle under heating in the co-presence of an excess alcohol is known, but this reaction requires heating at a high temperature or when an alcohol having a high boiling point is used, the excess alcohol can be hardly removed. Also, the hydrophobic fine particle obtained by this esterification method is disadvantageous in that the hydrophobicity is readily lost resulting from hydrolysis of the alkoxy group.

On the other hand, another method of treating the surface of the inorganic oxide fine particle with a silylating agent is known, and this method is preferred because the treatment can be performed under mild conditions as compared with the esterification method.

For preventing the aggregation of fine particles even when the fine particle concentration is increased in the drying process after the coating solution containing the fine particle is coated, it is necessary that 1.4 or more silyl groups are bound per the surface area of 1 nm² of the silylation-treated inorganic oxide fine particle. The number of silyl groups bound is preferably 1.5 or more, and most preferably 1.6 or more. If the number of silyl groups bound is less than 1.4, fine particles are aggregated in the drying process to generate point defects or unevenness and the film surface state is worsened.

In view of characteristics of the optical film, the number of silyl groups bound per the surface area of 1 nm² of the fine particle has no upper limit, but in order to bind 3.0 or more silyl groups, a large amount of a silylating agent and a treatment at a high temperature of 100° C. or more are necessary and this is not preferred in view of industrial efficiency.

The amount of the silyl group bound to the inorganic oxide fine particle can be known by the method of measuring the carbon content from the elemental analysis of the silylation-treated inorganic oxide fine particle. The number of silyl groups per the unit surface area can be calculated by dividing the obtained value by the specific surface area of the fine particle determined by the BET method.

In the case of a composition where the inorganic oxide fine particle is already dispersed in an organic solvent or the like, the inorganic oxide fine particle can be isolated by centrifugal separation or the like, and the binding amount of the silyl group can be known by measuring the carbon content similarly to above. In the case where the composition comprises plural kinds of inorganic oxide fine particles and individual particles cannot be isolated, the plurality of mixed fine particles are measured at the same time and the averaged value is used as the binding amount of the silyl group.

Furthermore, when the inorganic oxide fine particle is contained in the transparent film or optical film, the binder component or support is decomposed with a nitric acid and after dilution with water, centrifugal separation is performed, whereby the inorganic oxide fine particle can be isolated. The binding amount of the silyl group can be known by measuring the carbon content similarly to above.

(Silylation Treatment)

The silylation treatment of the inorganic oxide fine particle can be performed by causing a silylating agent represented by formula (I) to act on the surface of the inorganic oxide fine particle.

$$R^{10}{}_m Si(X)_{4-m} \qquad \text{Formula (I)}$$

(wherein $R^{10}$ represents a substituted or unsubstituted alkyl group or a substituted or unsubstituted aryl group, X represents a hydroxyl group or a hydrolyzable group, and m represents an integer of 1 to 3).

[Silylating Agent]

The silylating agent for use in the present invention is described in detail below.

In formula (I), $R^{10}$ represents a substituted or unsubstituted alkyl group or a substituted or unsubstituted aryl group. Examples of the alkyl group include methyl, ethyl, propyl, isopropyl, hexyl, tert-butyl, sec-butyl, hexyl, decyl and hexadecyl. The alkyl group is preferably an alkyl group having a carbon number of 1 to 30, more preferably from 1 to 16, still more preferably from 1 to 6. Examples of the aryl group include phenyl and naphthyl, with a phenyl group being preferred.

X represents a hydroxyl group or a hydrolyzable group. Examples of the hydrolyzable group include an alkoxy group (preferably an alkoxy group having a carbon number of 1 to 5, e.g., methoxy, ethoxy), a halogen atom (e.g., Cl, Br, I) and $R^2COO$ (wherein $R^2$ is preferably a hydrogen atom or an alkyl group having a carbon number of 1 to 5, e.g., $CH_3COO$, $C_2H_5COO$). X is preferably an alkoxy group, more preferably a methoxy group or an ethoxy group.

m represents an integer of 1 to 3. When a plurality of $R^{10}$'s or X's are present, the plurality of $R^{10}$'s or X's may be the same or different. m is preferably 1 or 2, more preferably 1.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxy-carbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. Incidentally, in the present invention, the hydrogen atom is substituted by a single atom, for the sake of convenience, this is referred to as a substituent.

When a plurality of $R^{10}$'s are present, at least one is preferably a substituted alkyl group or a substituted aryl group. In particular, an organosilane compound having a vinyl polymerizable substituent represented by the following formula (II) is preferred.

Formula (II):

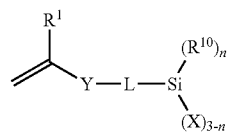

In formula (II), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, an ester group, an amido group, an ether group or a urea group. Y is preferably a single bond, an ester group or an amido group, more preferably a single bond or an ester group, still more preferably an ester group.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group (e.g., ether, ester, amido). L is preferably a substituted or unsubstituted alkylene group having a carbon number of 2 to 10, a substituted or unsubstituted arylene group having a carbon number of 6 to 20, or a substituted or unsubstituted alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of X's are present, the plurality of X's may be the same or different. n is preferably 0.

$R^{10}$ has the same meaning as $R^{10}$ in formula (I) and is preferably a substituted or unsubstituted alkyl group or an unsubstituted aryl group, more preferably an unsubstituted alkyl group or an unsubstituted aryl group.

X has the same meaning as X in formula (I) and is preferably a halogen, a hydroxyl group or an unsubstituted alkoxy group, more preferably a chlorine atom, a hydroxyl group or an unsubstituted alkoxy group having a carbon number of 1 to 6, still more preferably a hydroxyl group or an alkoxy having a carbon number of 1 to 3, and yet still more preferably a methoxy group.

Two or more kinds of the compounds represented by formulae (I) may be used in combination. Specific examples of the compound represented by formula (I) are set forth below, but the present invention is not limited thereto.

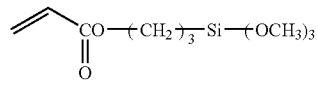

M-1

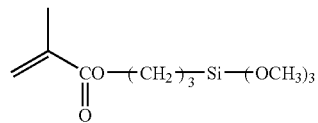

M-2

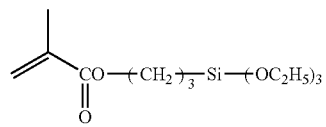

M-3

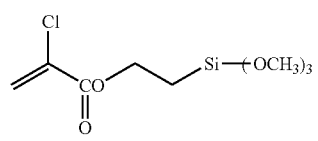

M-4

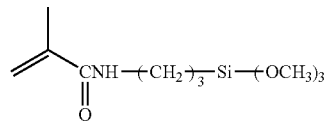

M-5

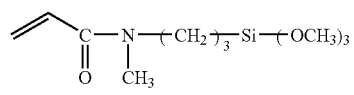

M-6

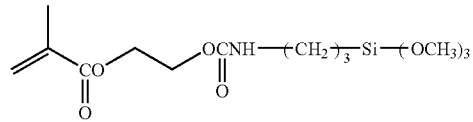

M-7

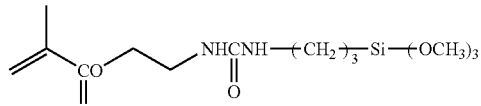

M-8

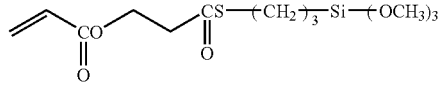

M-9

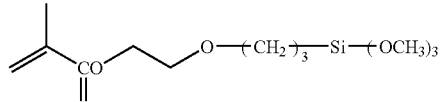

M-10

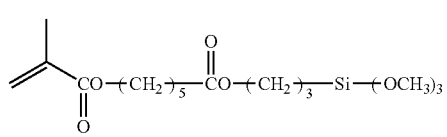

M-11

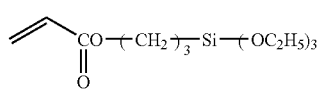

M-12

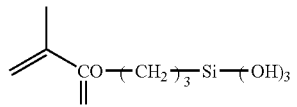

M-13

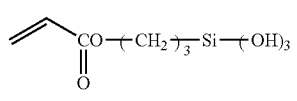

M-14

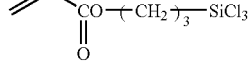

M-15

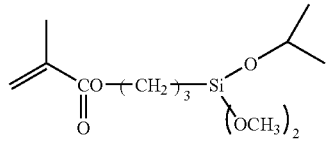

M-16

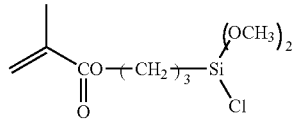

M-17

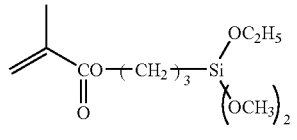

M-18

M-19

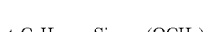

M-20

M-21

M-22

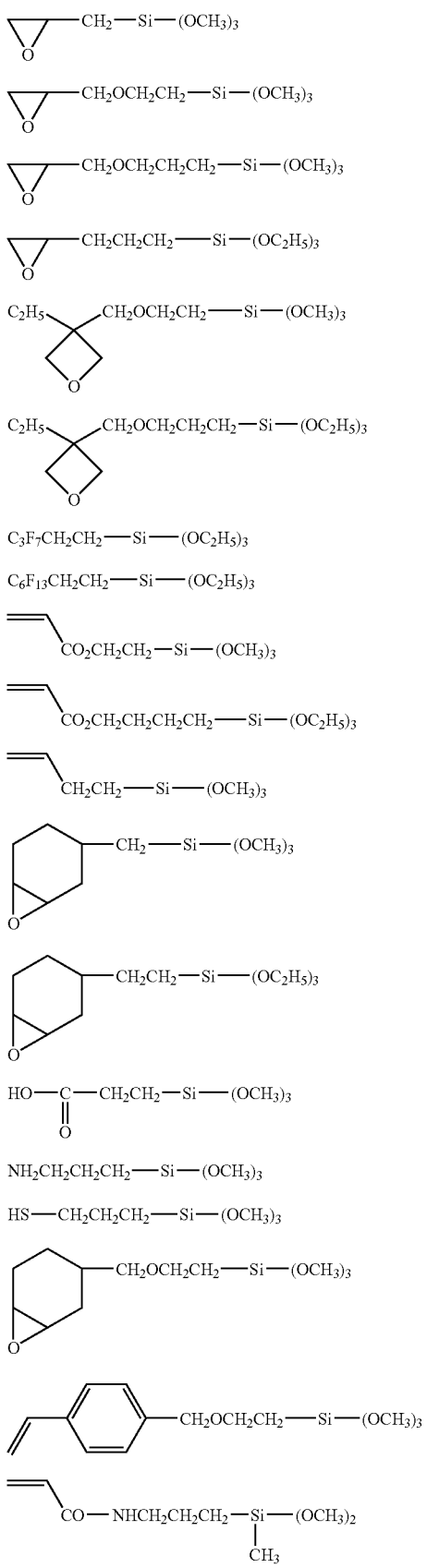

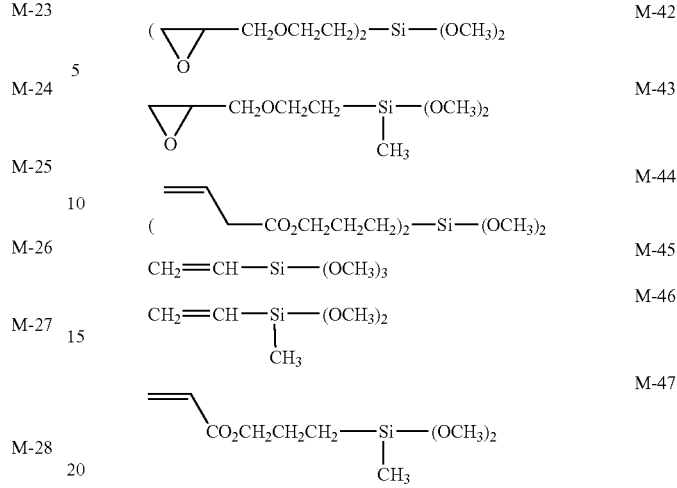

Among these specific examples, (M-1), (M-2) and (M-25) are preferred.

In the present invention, the amount used of the silylating agent represented by formula (I) is not particularly limited but is preferably from 0.1 to 150 mass %, more preferably from 0.3 to 100 mass %, and most preferably from 1 to 75 mass %, based on the inorganic oxide fine particle, and in terms of the amount used per the surface area of the inorganic oxide fine particle, preferably from 0.1 to 10 mmol, more preferably from 0.5 to 5 mmol, and most preferably from 1.2 to 3 mmol, per the surface area of 100 m² of the fine particle. When the amount of the silylating agent used is in this range, a sufficiently high effect of stabilizing the liquid dispersion is obtained and the film strength at the formation of coating film is large enough.

[Inorganic Oxide Fine Particle]

The inorganic oxide fine particle which can be used in the present invention is described below.

In view of the colorlessness of the resulting cured film of the curable composition, the inorganic oxide fine particle is preferably an oxide particle of at least one element selected from the group consisting of silicon, aluminum, zirconium, titanium, zinc, germanium, indium, tin, antimony and cerium.

Examples of the inorganic oxide fine particle include particles of silica, alumina, zirconia, titanium oxide, zinc oxide, germanium oxide, indium oxide, tin oxide, indium-tin oxide (ITO), antimony oxide and cerium oxide. Among these, particles of silica, alumina, zirconia and antimony oxide are preferred because of high hardness. One of these inorganic oxide fine particles may be used alone or two or more thereof may be used in combination. Furthermore, the inorganic oxide fine particle is preferably used as an organic solvent dispersion. In the case of use as an organic solvent dispersion, the dispersion medium is preferably an organic solvent in view of compatibility with other components and dispersibility. Examples of such an organic solvent include alcohols such as methanol, ethanol, isopropanol, butanol and octanol; ketones such as acetone, methyl ethyl ketone, methyl isobutyl ketone and cyclohexanone; esters such as ethyl acetate, butyl acetate, ethyl lactate, γ-butyrolactone, propylene glycol monomethyl ether acetate and propylene glycol monomethyl ether acetate; ethers such as ethylene glycol monomethyl ether and diethylene glycol monobutyl ether; aromatic hydrocarbons such as benzene, toluene and xylene; and amides such as dimethylformamide, dimethylacetamide and N-methylpyrrolidone. Among these, preferred are methanol, isopropanol, butanol, methyl ethyl ketone, methyl isobutyl ketone, ethyl acetate, butyl acetate, toluene and xylene.

The average particle diameter of the inorganic oxide fine particle is from 3 to 3,000 nm, but in the case of incorporating the inorganic oxide fine particle into the low refractive index layer, the number average particle diameter is preferably from 3 to 200 nm, more preferably from 5 to 100 nm. Also, in the case of incorporating the inorganic oxide fine particle into a hard coat layer, the number average particle diameter is preferably from 3 to 3,000 nm, more preferably from 5 to 2,000 nm. If the average particle diameter exceeds 5,000 nm, a cured product reduced in the transparency or a coating film having a deteriorated surface state tends to result. In order to improve the dispersibility of particles, various surfactants or amines may also be added.

In this specification, the average particle diameter means a number average particle diameter and can be measured by light scattering method or electron microscope photograph.

Examples of the commercial product available on the market as a liquid dispersion of the silicon oxide fine particle (e.g., silica particle) include, as a colloidal silica, Methanol Silica Sol, MA-ST-MS, IPA-ST, PA-ST-MS, IPA-ST-L, IPA-ST-ZL, IPA-ST-UP, EG-ST, NPC-ST-30, MEK-ST, MEK-ST-L, MIBK-ST, NBA-ST, XBA-ST, DMAC-ST, ST-UP, ST-OUP, ST-20, ST40, ST-C, ST-N, ST-O, ST-50 and ST-OL produced by Nissan Chemical Industries, Ltd.; and, as a hollow silica, CS60-IPA produced by Catalysts & Chemicals Industries Co., Ltd.

Other examples include, as a powder silica, KE-P150 and KE-P250 produced by Japan Synthetic Rubber Co., Ltd.; Aerosil 130, Aerosil 300, Aerosil 380, Aerosil TT600 and Aerosil OX50 produced by Nippon Aerosil Co., Ltd.; Sildex H31, H32, H51, H52, H121 and H122 produced by Asahi Glass Co., Ltd.; E220A and E220 produced by Nippon Silica Kogyo K.K.; Sylysia 470 produced by Fuji Silysia Chemical Ltd.; and SG Flake produced by Nippon Sheet Glass Co., Ltd.

Still other examples include, as a water dispersion of alumina fine particle, Alumina Sol-100, 200 and 520 produced by Nissan Chemical Industries, Ltd.; as an isopropanol dispersion of alumina, AS-1501 produced by Sumitomo Osaka Cement Co., Ltd.; as a toluene dispersion of alumina, AS-ISOT produced by Sumitomo Osaka Cement Co., Ltd.; as a toluene dispersion of zirconia, HXU-110JC produced by Sumitomo Osaka Cement Co., Ltd.; as a water dispersion of zinc antimonate powder, Celnax produced by Nissan Chemical Industries, Ltd.; as a powder such as alumina, titanium oxide, tin oxide, indium oxide or zinc oxide, or a solvent dispersion thereof, NanoTek produced by C.I. Kasei Co., Ltd.; as a water dispersion sol of antimony-doped tin oxide, SN-100D from Ishihara Sangyo Kaisha, Ltd.; as an ITO powder, a product produced by Mitsubishi Materials Corp.; and as a water dispersion of cerium oxide, Needral produced by Taki Chemical Co., Ltd.

The shape of the inorganic oxide fine particle is spherical, hollow, porous, rod-like, plate-like, fibrous or amorphous, preferably spherical or hollow. The hollow silica particle is described later. The specific surface area of the inorganic oxide fine particle (as measured by the BET specific surface area measuring method using nitrogen) is preferably from 10 to 1,000 $m^2/g$, more preferably from 100 to 500 $m^2/g$. This inorganic oxide fine particle may be used by dispersing its powder in the dry state in an organic solvent. For example, a liquid dispersion of fine particulate oxide particle, known in the art as a solvent dispersion sol of the above-described oxide, may be used directly.

[Solvent in Silylation Treatment]

The silylation treatment may be performed with or without a solvent. In the case of using a solvent, the silylating agent concentration may be appropriately decided. The solvent is preferably an organic solvent in the light of uniformly mixing the components, and suitable examples thereof include alcohols, aromatic hydrocarbons, ethers, ketones and esters.

The solvent is preferably a solvent capable of dissolving the silylating agent. Also, the organic solvent is preferably used as a coating solution or a part of a coating solution in view of the process and when mixed with other materials such as fluorine-containing polymer, preferably does not impair the solubility or dispersibility.

Out of these organic solvents, examples of the alcohols include a monohydric alcohol and a dihydric alcohol. The monohydric alcohol is preferably a saturated aliphatic alcohol having a carbon number of 1 to 8. Specific examples of the alcohols include methanol, ethanol-n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol monoethyl ether acetate.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of such organic solvents may be used alone or two or more thereof may be used in combination. The silylating agent concentration based on the solvent in the treatment is not particularly limited but is usually from 0.1 to 70 mass %, preferably from 1 to 50 mass %.

In the present invention, after the inorganic oxide fine particle is dispersed with an alcohol-based solvent, the dispersion solvent is preferably displaced by an aromatic hydrocarbon solvent or a ketone-based solvent. From the standpoint of increasing the affinity for a binder used in combination at the coating or enhancing the stability of the dispersion itself, displacement by a ketone-based solvent is preferred.

Using this inorganic oxide fine particle of which surface is silylation-treated, a coating solution for the formation of an optical functional layer is prepared by combining it with a binder composition and coated, whereby an optical functional layer can be formed. In particular, the layer formed is suitably a low refractive index of an antireflection film.

[Silylation Reaction]

The silylation reaction proceeds even at an ordinary temperature after the addition of a silylating agent but may be accelerated under heating. In the case of an ordinary temperature, the reaction is preferably performed for 1 day or more. In the case of reaction under heating, the reaction time may be usually several hours. The heating is preferably performed at a temperature lower than the boiling point of the reaction medium, more preferably at 40 to 100° C.

(Layer Construction of Optical Film)

The optical film of the present invention has, if desired, a hard coat layer described later on a substrate film (transparent support), and layers are stacked thereon as an optical functional layer by taking account of refractive index, thickness, number of layers and order of layers so as to reduce the reflectance by the optical interference. In a simplest layer construction of the low reflection stacked body, only a low refractive index layer is provided on a substrate film. In order to more reduce the reflectance, the antireflection layer is preferably constituted by combining a high refractive index layer having a refractive index higher than that of the substrate film and a low refractive index layer having a refractive index lower than that of the substrate film. Examples of the construction include a two-layer construction of high refractive index layer/low refractive index layer from the substrate side, and a construction comprising three layers differing in the refractive index and stacked in the order of a middle refractive index layer (a layer having a refractive index higher than that of substrate film or hard coat layer but lower than that of high refractive index layer)/a high refractive index layer/a low refractive index layer. Also, a layer construction where a larger number of antireflection layers are stacked has been proposed. In view of durability, optical properties cost, productivity and the like, a middle refractive index layer/a high refractive index layer/a low refractive index layer are preferably coated in this order on a substrate film having thereon a hard coat layer.

Preferred examples of the layer construction of the low reflection stacked body for use in the present invention are set forth below:

substrate film/low refractive index layer, substrate film/antiglare layer/low refractive index layer, substrate film/hard coat layer/antiglare layer/low refractive index layer, substrate film/hard coat layer/high refractive index layer/low refractive index layer, substrate film/hard coat layer/medium refractive index layer/high refractive index layer/low refractive index layer, substrate film/antiglare layer/high refractive index layer/low refractive index layer, substrate film/antiglare layer/medium refractive index layer/high refractive index layer/low refractive index layer, substrate film/antistatic layer/hard coat layer/medium refractive index layer/high refractive index layer/low refractive index layer, antistatic layer/substrate film/hard coat layer/medium refractive index layer/high refractive index layer/low refractive index layer, substrate film/antistatic layer/antiglare layer/medium refractive index layer/high refractive index layer/low refractive index layer, antistatic layer/substrate film/antiglare layer/medium refractive index layer/high refractive index layer/low refractive index layer, and antistatic layer/substrate film/antiglare layer/high refractive index layer/low refractive index layer/high refractive index layer/low refractive index layer.

As long as the reflectance can be reduced by the optical interference, the construction is not particularly limited to these layer constructions. The hard coat layer may be an antiglare hard coat layer imparted with an antiglare function. Also, the hard coat layer may be a light-diffusing hard coat layer not having an antiglare function but having a light-diffusing function. Furthermore, an antiglare function, a hard coat function and a light-diffusing function may be imparted to the high refractive index layer or medium refractive index layer. The antistatic layer is preferably a layer containing an electrically conducting polymer particle or a metal oxide fine particle (e.g., $SnO_2$, ITO) and may be provided, for example by coating or atmospheric plasma treatment.

[Material for Low Refractive Index Layer]

The low refractive index layer is preferably formed of a cured film of a copolymer comprising, as essential constituent components, a repeating unit derived from a fluorine-containing vinyl monomer and a repeating unit having a (meth)acryloyl group in the side chain. Similarly, a low refractive index layer formed with a cured film of a copolymer having a repeating unit containing a hydroxyl group as a constituent component is preferred. The component originated in this copolymer preferably occupies 60 mass % or more, more preferably 70 mass % or more, still more preferably 80 mass % or more, of the solid content of the film. In the light of satisfying both low refractive index and film hardness, a curing agent such as polyfunctional (meth)acrylate is also preferably used in an amount within the range of not impairing compatibility.

The refractive index of the low refractive index layer is preferably from 1.20 to 1.46, more preferably from 1.25 to 1.46, still more preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less, and most preferably 1% or less. The specific strength of the low refractive index layer is, in the pencil hardness test with a load of 500 g, preferably H or more, more preferably 2H or more, and most preferably 3H or more.

In order to improve the antifouling performance of the optical film, the contact angle with water of the surface is preferably 90° or more, more preferably 95° or more, still more preferably 100° or more.

The copolymer which is preferably used for the low refractive index layer of the present invention is described below.

Examples of the fluorine-containing vinyl monomer include fluoroolefins (e.g., fluoroethylene, vinylidene fluoride, tetrafluoroethylene, hexafluoropropylene), partially or completely fluorinated alkyl ester derivatives of (meth)acrylic acid (e.g., BISCOTE 6FM (trade name, produced by Osaka Organic Chemical Industry Ltd.), R-2020 (trade name, produced by Daikin Industries, Ltd.)), and completely or partially fluorinated vinyl ethers. Among these, perfluoroolefins are preferred, and hexafluoropropylene is more preferred in view of refractive index, solubility, transparency, availability and the like. When the compositional ratio of the fluorine-containing vinyl monomer is increased, the refractive index may be lowered but the film strength decreases. In the present invention, the fluorine-containing vinyl monomer is preferably introduced such that the copolymer has a fluorine content of 20 to 60 mass %, more preferably from 25 to 55 mass %, still more preferably from 30 to 50 mass %.

The copolymer for use in the present invention preferably has, as the essential constituent component, a repeating unit having a (meth)acryloyl group in the side chain. When the compositional ratio of the (meth)acryloyl group-containing repeating unit is increased, the film strength may be enhanced but the refractive index also increases. In general, the (meth)acryloyl group-containing repeating unit preferably occupies from 5 to 90 mass %, more preferably from 30 to 70 mass %, still more preferably from 40 to 60 mass %, though this may vary depending on the kind of the repeating unit derived from the fluorine-containing monomer.

Further, those having a repeating unit containing a hydroxyl group in the side chain as an essential constituent component are also preferred. In general, the hydroxyl group-containing repeating unit preferably occupies 5 to 70% by mass, more preferably 10 to 60% by mass, and particularly preferably 15 to 50% by mass.

In the copolymer useful for the present invention, in addition to the repeating unit above, other vinyl monomers may be appropriately copolymerized from various viewpoints such as adhesion to substrate, Tg (that contributes to film strength)

of polymer, solubility in solvent, transparency, slipperiness, dust resistance and antifouling property. A plurality of these vinyl monomers may be used in combination according to the purpose and are preferably introduced to give a total content of 0 to 65 mol %, more preferably from 0 to 40 mol %, still more preferably from 0 to 30 mol %, in the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and an acrylonitrile.

(Preferable Embodiment of Fluorine-Containing Polymer)

As preferable embodiments of the fluorine-containing polymer used for the invention, those represented by the following formula 1 or 2 are mentioned.

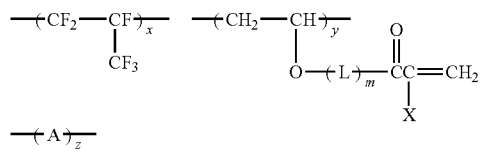

Formula 1

In formula 1, L represents a linkage group with 1 to 10 carbon atoms, more preferably a linkage group with 1 to 6 carbon atoms, and particularly preferably a linkage group with 2 to 4 carbon atoms. L may be of straight chain, have a branched structure, may have a cyclic structure, and may have a hetero-atom selected from O, N and S.

As preferable examples, *—$(CH_2)_2$—O—**, *—$(CH_2)_2$—NH—**, *—$(CH_2)_4$—**, *—$(CH_2)_6$—O—**, *—$(CH_2)_2$—O—$(CH_2)_2$—O—**, *—CONH—O—$(CH_2)_3$—O—**, *—$CH_2CH(OH)CH_2$—O—**, *—$CH_2CH_2OCONH(CH_2)_3$—O—** (The mark * represents the linkage position at the principal chain side of the polymer, and the mark ** represents the linkage position at the (meth)acryloyl group side.) are mentioned. m represents an integer of 0 or 1.

In formula 1, X represents a hydrogen atom or a methyl group. From the viewpoint of curing reactivity, a hydrogen atom is more preferred.

In formula 1, A represents a repeating unit derived from an arbitrary vinyl monomer, which is not specifically limited so long as it is a constituent component of a monomer copolymerizable with hexafuloropropylene. An appropriate repeating unit can be chosen from various viewpoints such as adhesion to the substrate, Tg of the polymer (which contributes to film hardness), the solubility in a solvent, transparency, lubricating property, dust preventive and contamination preventive property. The repeating unit may comprise a single or plural vinyl monomers depending on the object.

As preferable examples, vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl lactate, (meth)acrylates such as methyl(meth)acrylate, ethyl(meth)acrylate, hydroxyethyl(meth)acrylates, glycidyl (meth)acrylates, allyl (meth)acrylate and (meth)acryloyloxypropyltrimethoxysilane, styrene and its derivatives such as p-hydroxymethylstyrene, unsaturated carboxylic acids and their derivatives such as crotonic acid, maleic acid and itaconic acid can be mentioned. Vinyl ether derivatives and vinyl ester derivatives are more preferred, and vinyl ether derivatives are particularly preferred.

x and y and z each represent the mol % of each constituent component, and satisfy $30 \leq x \leq 60$, $5 \leq y \leq 70$ and $0 \leq z \leq 65$. Preferably, each satisfies $35 \leq x \leq 55$, $30 \leq y \leq 60$ and $0 \leq z \leq 20$, and particularly preferably $40 \leq x \leq 55$, $40 \leq y \leq 55$ and $0 \leq z \leq 10$, provided that x+y+z=100.

As a still more preferable embodiment of the copolymer used in the invention, formula 2 is also mentioned.

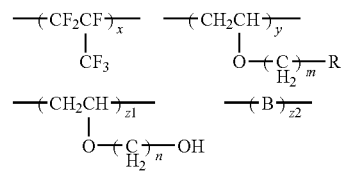

Formula 2

In formula 2, R represents an alkyl group with 1 to 10 carbon atoms, but may also represent an ethylenically unsaturated group (—C(=O)C(—X)=$CH_2$) like the compound represented by formula 1.

m represents an integer satisfying $1 \leq m \leq 10$, whereby $1 \leq m \leq 6$ is more preferred, and $1 \leq m \leq 4$ is particularly preferred.

n represents an integer satisfying $2 \leq n \leq 10$, whereby $2 \leq n \leq 6$ is more preferred, and $2 \leq n \leq 4$ is particularly preferred.

B represents a repeating unit derived from an arbitrary vinyl monomer, and may comprise a single component or plural components. Further, it may contain a silicone moiety.

x, y, z1 and z2 each represent mole % of their corresponding repeating units, and x and y each preferably satisfy $30 \leq x \leq 60$ and $0 \leq y \leq 70$, more preferably $35 \leq x \leq 55$ and $0 \leq y \leq 60$, and particularly preferably $40 \leq x \leq 55$ and $0 \leq y \leq 55$. With respect to z1 and z2, satisfaction of the relations; $1 \leq z1 \leq 65$ and $1 \leq z2 \leq 65$ is preferred, more preferably the relations are $1 \leq z1 \leq 40$ and $1 \leq z2 \leq 10$, and particularly preferably the relations are $1 \leq z1 \leq 30$ and $1 \leq z2 \leq 5$, provided that x+y+z1+z2=100.

The inorganic fine particle which can be preferably used in the low refractive index film of the antireflection layer of the present invention is described below.

The coated amount of the inorganic fine particle is preferably from 1 to 100 mg/m$^2$, more preferably from 5 to 80 mg/m$^2$, still more preferably from 10 to 60 mg/m$^2$. If the blending amount is too small, the effect of improving the scratch resistance decreases, whereas if it is excessively large, fine irregularities are generated on the low refractive index layer surface and the appearance (e.g., real black) or the integrated reflectance may deteriorate. The inorganic fine particle is incorporated into the low refractive index layer and therefore, preferably has a low refractive index.

Specifically, an inorganic oxide particle having dispersibility improved by the above-described silylation treatment or a hollow inorganic oxide fine particle, which has a low refractive index layer, is preferably used. Examples thereof include a silica fine particle and a hollow silica fine particle. The average particle diameter of the silica fine particle is preferably from 30 to 150%, more preferably from 35 to 80%, still more preferably from 40 to 60%, of the thickness of the low refractive index layer. In other words, when the thickness of the low refractive index layer is 100 nm, the particle diameter of the silica fine particle is preferably from 30 to 150 nm, more preferably from 35 to 80 nm, still more preferably from 40 to 60 nm.

If the particle diameter of the silica fine particle is too small, the effect of improving the scratch resistance is reduced, whereas if it is excessively large, fine irregularities are generated on the low refractive index layer surface and the appearance (e.g., real black) or the integrated reflectance may be deteriorated. The silica fine particle may be either crystalline or amorphous and may be a monodisperse particle or may be even an aggregate particle as long as the predetermined particle diameter is satisfied. The shape is most preferably spherical but even if amorphous, there arises no problem.

In order to decrease the refractive index of the low refractive index layer, a hollow silica fine particle is preferably used. The hollow silica fine particle preferably has a refractive index of 1.17 to 1.40, more preferably from 1.17 to 1.35, still more preferably from 1.17 to 1.30. The refractive index used here indicates a refractive index of the particle as a whole and does not indicate a refractive index of only silica as an outer shell forming the hollow silica particle. At this time, assuming that the radius of the cavity inside the particle is a and the radius of the outer shell of the particle is b, the porosity x is calculated according the following mathematical formula (I).

$$x = (4\pi a^3/3)/(4\pi b^3/3) \times 100 \quad \text{(Mathematical Formula I)}$$

The porosity x is preferably from 10 to 60%, more preferably from 20 to 60%, and most preferably from 30 to 60%. If the hollow silica particle is rendered to have a lower refractive index and a higher porosity, the thickness of the outer shell becomes small and the strength as a particle decreases. Therefore, in view of scratch resistance, a particle having a refractive index as low as less than 1.17 cannot be used.

Here, the refractive index of the hollow silica particle was measured by an Abbe refractometer (manufactured by ATAGO K.K.).

The refractive index of the low refractive index layer can be decreased by incorporating a hollow particle into the layer. In the case of using a hollow particle, the refractive index of the layer is preferably from 1.20 to 1.46, more preferably from 1.25 to 1.41, and most preferably from 1.30 to 1.39.

Also, at least one kind of a silica fine particle having an average particle diameter corresponding to less than 25% of the thickness of the low refractive index layer (this particle is referred to as a "small-particle-size silica fine particle") is preferably used in combination with the above-described silica fine particle (this particle is referred to as a "large-particle-size silica fine particle"). The small-particle-size silica fine particle can be present in a gap between large-particle-size silica fine particles and therefore, can contribute as a holding agent for the large-particle-size silica fine particle.

When the thickness of the low refractive index layer is 100 nm, the average particle diameter of the small-particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

In the present invention, the surface free energy of the antireflection film surface is preferably reduced from the standpoint of enhancing the antifouling property. More specifically, a fluorine-containing compound or a compound having a polysiloxane structure is preferably used in the low refractive index layer. As for the additive having a polysiloxane structure, addition of a reactive group-containing polysiloxane (e.g., KF-100T, X-22-169AS, KF-102, X-22-3701IE, X-22-164B, X-22-5002, X-22-173B, X-22-167B, X-22-161AS (all trade names, produced by Shin-Etsu Chemical Co., Ltd.); AK-5, AK-30, AK-32 (all trade names, produced by Toagosei Co., Ltd.); SILAPLANE FM0725, SILAPLANE FM0721 (both trade names, produced by Chisso Corp.)) is also preferred. Furthermore, the silicone-based compounds described in Tables 2 and 3 of JP-A-2003-112383 may also be preferably used. Such a polysiloxane is preferably added in an amount of 0.1 to 10 mass %, more preferably from 1 to 5 mass %, based on the entire solid content of the low refractive index layer.

In the low refractive index layer, the hydrolyzed product and/or partial condensate thereof of an organosilane that has an ethylenically unsaturated group and has a hydroxyl group or a hydrolyzable group, which is directly attached to a silicon atom, i.e., a so-called sol component, is preferably contained. Such a hydrolyzed product and/or partial condensate thereof may be prepared with use of a single kind or plural kinds of the organosilane compound. It is preferred that the organosilane compound has a solubility parameter (SP value) larger than that of the binder polymer to be used in combination. With such a measure, the organosilane can be localized at the bottom portion of the low refractive index layer, thus enabling improvement of damage resistance without raising reflectance. The use amount (in ratio) of the organosilane sol is preferably, relative to the fluorine-containing polymer in the low refractive index layer, for example, 5 to 100% by mass, more preferably 5 to 40% by mass, still more preferably 8 to 35% by mass, and particularly preferably 10 to 30% by mass. Provided that the use amount is at least the lower limit, the effect of the invention is well exhibited, while, if the use amount does not exceed the upper limit, any trouble including deterioration of film configuration or film surface structure preferably does not occur.

(SP Value)

A SP value of a compound indicates solubility parameter, which represents in terms of a numerical value how easily the compound dissolves in solvents or the like, has the same meaning as polarity often used for organic compounds. A larger SP value indicates that the compound has a higher polarity. The binder polymer for the low refractive index layer used in the invention is preferably a thermally and/or ionizing radiation-curable fluorine-containing polymer, whose SP value does not exceed 20 if calculated by the Fedors method as an example. The SP value of the organosilane sol set forth in the foregoing paragraph can also be calculated in a similar manner. The SP value of the organosilane sol in the sol solution used for the examples of the invention to be described later is around 22.

The low refractive index layer preferably contains a polymerization initiator, too. Though no special limitation is posed for the polymerization initiator so long as it is one usually in use, those having an SP value larger than that of the binder polymer used in conjunction therewith is preferred.

[Material for Hard Coat Layer]

In the antireflection film of the present invention, a hard coat layer is preferably provided. The hard coat layer may be formed from a binder, a matting particle for imparting an antiglare function or a light-diffusing function, and an inorganic fine particle for elevating the refractive index, preventing the crosslinking shrinkage and increasing the strength.

As for the binder component, a compound having an ethylenically unsaturated group is preferred in view of, for example, film strength, stability of coating solution and productivity of coating film. The main film-forming binder means a binder occupying 10 mass % or more in the film-forming components excluding the inorganic fine particle. The proportion of the main film-forming binder is preferably from 20 to 100 mass %, more preferably from 30 to 95 mass %.

The main film-forming binder is preferably a polymer having a saturated hydrocarbon chain or a polyether chain as the main chain, more preferably a polymer having a saturated hydrocarbon chain as the main chain. The binder polymer having a saturated hydrocarbon chain as the main chain and at the same time having a crosslinked structure is preferably a (co)polymer of a monomer having two or more ethylenically unsaturated groups.

In order to elevate the refractive index, this monomer structure preferably contains an aromatic ring or at least one atom selected from a halogen atom (except for fluorine), a sulfur atom, a phosphorus atom and a nitrogen atom.

Examples of the monomer having two or more ethylenically unsaturated groups include an ester of a polyhydric alcohol and a (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), a vinylbenzene and a derivative thereof (e.g., 1,4-divinylbenzene, 2-acryloylethyl 4-vinylbenzoate, 1,4-divinylcyclohexanone), a vinylsulfone (e.g., divinylsulfone), an acrylamide (e.g., methylenebisacrylamide) and a methacrylamide. Two or more of these monomers may be used in combination. In present invention, the term "(meth)acrylate" means "acrylate or methacrylate".

Specific examples of the high refractive index monomer include bis(4-methscryloylthiophenyl)sulfide, vinylnaphthalene, biphenyl sulfide and 4-methacryloxy-phenyl-4'-methoxyphenyl thioether. Also, two or more of these monomers may be used in combination.

The polymerization of such an ethylenically unsaturated group-containing monomer can be performed by ionizing radiation irradiation or heating in the presence of a photoradical initiator or a thermal radical initiator.

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl4-methylthio-2-morpholinopropiophenone and 2-benzyl-2-dimethylamino-1-(4-morpholinophenyl)-butanone. Examples of the benzoins include benzoin-benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethyl-benzoyldiphenylphosphine oxide.

Also, various examples are described in *Saishin UW Koka Gijutsu* (*Latest UV Curing Technology*), page 159, Kazuhiro Takausu (publisher), Gijutsu Joho Kyokai (publishing company) (1991) and these are useful in the present invention.

Preferred examples of the commercially available photoradical polymerization initiator of photo-cleavage type include Irgacure (651, 184 and 907) produced by Nippon Ciba-Geigy.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

As for the thermal radical initiator, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2-azo-bis-isobutyronitrile, 2-azo-bis-propionitrile and 2-azo-bis-cyclohexanedinitrile; and examples of the diazo compound include diazoaminobenzene and p-nitrobenzenediazorium.

In the present invention, a polymer having a polyether as the main chain may also be used. This polymer is preferably a ring-opened polymer of a polyfunctional epoxy compound. The ring-opening polymerization of the polyfunctional epoxy compound may be performed by ionizing radiation irradiation or heating in the presence of a photoacid generator or a thermal acid generator.

A crosslinked structure may be introduced into the binder polymer by using a crosslinking functional group-containing monomer in place of or in addition to the monomer having two or more ethylenically unsaturated groups, thereby introducing the crosslinking functional group into the polymer, and reacting the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. In addition, a vinylsulfonic acid, an acid anhydride, a cyanoacrylate derivative, a melamine, an etherified methylol, an ester, a urethane, and a metal alkoxide (e.g., tetramethoxysilane) may also be utilized as the monomer for introducing a crosslinked structure. A functional group which exhibits a crosslinking property as a result of decomposition reaction, such as block isocyanate group, may also be used. That is, in the present invention, the crosslinking functional group may be a functional group which exhibits reactivity not directly but as a result of decomposition.

The binder polymer having such a crosslinking functional group can form a crosslinked structure under heating after coating.

In the hard coat layer, a matting particle having an average particle diameter of 0.1 to 5.0 µm, preferably from 1.5 to 3.5 µm, such as inorganic compound particle or resin particle, may be contained for imparting antiglare property. If the difference in the refractive index between the matting particle and the binder is too large, the film may become white turbid, whereas if the difference is excessively small, a sufficiently high light-diffusing effect cannot be obtained. Therefore, the difference is preferably from 0.02 to 0.20, more preferably from 0.04 to 0.10. Similarly to the refractive index, if the amount added of the matting particle based on the binder is too large, the film may become white turbid, whereas if it is excessively small, a sufficiently high light-diffusing effect cannot be obtained. Therefore, the amount added of the matting particle is preferably from 3 to 30 mass %, more preferably from 5 to 20 mass %.

Specific preferred examples of the matting particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, a crosslinked styrene particle, a crosslinked acryl particle and a silica particle are more preferred.

The shape of the matting particle may be either true spherical or amorphous.

It is preferred that the matting particle of the inorganic compound is subjected to the above-mentioned silylation treatment.

Also, two or more different kinds of matting particles may be used in combination. In the case of using two or more kinds of matting particles, in order to effectively bring out the refractive index control by virtue of the mixing of two matting particles, the difference in the refractive index is preferably from 0.02 to 0.10, more preferably from 0.03 to 0.07. Furthermore, a matting particle having a larger particle diameter can impart antiglare property, while a matting particle having a smaller particle diameter imparts another optical property. For example, an optical film laminated on a high definition display of 133 ppi or more is required to be free from an optical defect called glaring. The glaring is ascribable to loss of brightness uniformity resulting from enlargement or shrinkage of a pixel due to irregularities (contributing the antiglare property) present on the film surface, but this can be greatly improved by using together a matting particle having a particle diameter smaller than that of the matting particle which contributes to the antiglare property and having a refractive index differing from that of the binder.

The particle diameter distribution of this matting particle is most preferably monodisperse, and individual particles preferably have the same particle diameter as much as possible. For example, when a particle having a particle diameter 20% or more larger than the average particle diameter is defined as a coarse particle, the percentage of coarse particles in all particles is preferably 1% or less, more preferably 0.1% or less, still more preferably 0.01% or less. The matting particle having such a particle diameter distribution is obtained by classifying the particles after a normal synthesis reaction, and when the number of classifications is increased or the level of classification is elevated, a matting agent having a more preferred distribution can be obtained.

The matting particle is preferably contained in the hard coat layer such that the amount of the matting particle in the formed hard coat layer is from 10 to 1,000 mg/m², more preferably from 100 to 700 mg/m².

The particle size distribution of the matting particle is measured by a Coulter counter method, and the measured distribution is converted into a particle number distribution.

In order to elevate the refractive index of the hard coat layer, the layer preferably contains, in addition to the above-described matting particle, an inorganic fine particle comprising an oxide of at least one metal selected from titanium, zirconium, aluminum, indium, zinc, tin and antimony and having an average particle diameter of 0.2 µm or less, preferably 0.1 µm or less, more preferably 0.06 µm or less.

Furthermore, in order to increase the difference in the refractive index from the matting particle, a silicon oxide is preferably used in the hard coat layer using a high refractive index matting particle, so that the refractive index of the layer can be kept rather low. The preferred particle diameter is the same as that of the above-described inorganic fine particle.

Specific examples of the inorganic fine particle for use in the hard coat layer include $TiO_2$, $ZrO_2$, $Al_2O_3$, $In_2O_3$, $ZnO$, $SnO_2$, $Sb_2O_3$, ITO and $SiO_2$. Among these, $TiO_2$ and $ZrO_2$ are preferred from the standpoint of elevating the refractive index. The surface of the inorganic fine particle is preferably treated with a silylating agent as set forth above, and a surface treating agent having a functional group capable of reacting with the binder species on the filler surface is preferably used.

The amount added of such an inorganic fine particle is preferably from 10 to 90 mass %, more preferably from 20 to 80 mass %, still more preferably from 30 to 70 mass %, based on the entire mass of the hard coat layer.

Such as filler causes no scattering because the particle diameter is sufficiently smaller than the wavelength of light, and the dispersion obtained by dispersing the filler in the binder polymer behaves as an optically uniform material.

The mixture of the binder and the inorganic fine particle in the hard coat layer of the present invention preferably has a bulk refractive index of 1.48 to 2.00, more preferably from 1.50 to 1.80. The refractive index in this range can be obtained by appropriately selecting the kind of the binder and inorganic filler and the ratio of amounts thereof. The kind and ratio to be selected can be easily known by previously performing an experiment.

The haze value of the thus-formed optical film of the present invention is from 3 to 70%, preferably from 4 to 60%, and the average reflectance at 450 to 650 nm is 3.0% or less, preferably 2.5% or less.

When the haze value and average reflectance of the optical film of the present invention are in the above-described ranges, good antiglare and antireflection property can be obtained without incurring deterioration of the transmitted image.

[Support]

As for the transparent support of the optical film of the present invention, a plastic film is preferably used. Examples of the polymer forming a plastic film include a cellulose ester (e.g., triacetyl cellulose, diacetyl cellulose; as represented by TAC-ID80U and TD80UF produced by Fuji Photo Film Co., Ltd.), a polyamide, a polycarbonate, a polyester (e.g., polyethylene terephthalate, polyethylene naphthalate), a polystyrene, a polyolefin, a norbornene-based resin (e.g., Arton, trade name, produced by JSR Corp.), and an amorphous polyolefin (e.g., Zeonex, trade name, produced by Zeon Corp.). Among these, triacetyl cellulose, polyethylene terephthalate and polyethylene naphthalate are preferred, and triacetyl cellulose is more preferred. The cellulose acylate film substantially free from a halogenated hydrocarbon such as dichloromethane and the production process thereof are described in *JIII Journal of Technical Disclosure*, No. 2001-1745 (Mar. 15, 2001) (hereinafter simply referred to as "Technical Disclosure No. 2001-1745"), and the cellulose acylates described therein are also preferably used in the present invention.

Aside from this, a transparent support comprising the inorganic fine particle-containing composition of the present invention is preferably used.

(Production Method of Optical Film)

[Method for Forming Optical Functional Layer]

The optical film of the present invention can be formed by the following method, but the present invention is not limited to this method.

First, a coating solution containing components for forming each layer is prepared. The coating solution prepared is coated on a transparent support by a dip coating method, an air knife coating method, a curtain coating method, a roller coating method, a wire bar coating method, a gravure coating method or an extrusion coating method (see, U.S. Pat. No. 2,681,294), and then heated and dried. Out of these coating methods, when the coating solution is coated by a gravure coating method, a coating solution in a small coated amount as in each layer of the antireflection film can be coated with high film thickness uniformity and this is preferred. As for the gravure coating method, a microgravure coating method is more preferred, because the film thickness uniformity is high.

Furthermore, a coating solution in a small coated amount can be coated with high film thickness uniformity also by a die coating method. The die coating method is a pre measuring system and therefore, is advantageous in that the control of the film thickness is relatively easy and the transpiration of the solvent in the coated part less occurs. Two or more layers may be coated simultaneously. The simultaneous coating method is described in U.S. Pat. Nos. 2,761,791, 2,941,898, 3,508,947 and 3,526,528, and Yuji Harasaki Coating Kogaku (Coating Engineering), page 253, Asakura Shoten (1973).

[Saponification Treatment]

In the case of using the optical film of the present invention for a liquid display device, the optical film is disposed on the outermost surface of the display by providing a pressure-sensitive adhesive layer on one surface. In the case where the transparent support is triacetyl cellulose or the transparent film of the invention, it acts as the protective film for protecting the polarizer a polarizing plate and therefore, in view of the cost, the optical film of the present invention is preferably used directly as the protective film.

In the case where the optical film of the present invention is disposed on the outermost surface of a display, for example, by providing a pressure-sensitive adhesive layer on one surface or used directly as the protective film of a polarizing plate, for ensuring satisfactory adhesion, a saponification treatment is preferably performed after an outermost layer mainly comprising a fluorine-containing polymer is formed on a transparent support. The saponification treatment is performed by a known method, for example, by dipping the film in an alkali solution for an appropriate time period. After dipping in an alkali solution, the film is preferably well washed with water or dipped in a dilute acid to neutralize the alkali component so as to prevent the alkali component from remaining in the film.

By performing a saponification treatment, the surface of the transparent support on the side opposite the surface having the outermost layer is hydrophilized.

The hydrophilized surface is effective particularly for improving the adhesive property to a polarizing film mainly comprising a polyvinyl alcohol. Furthermore, the hydrophilized surface hardly allows for attachment of dusts in the air and therefore, dusts scarcely intrude into the space between the polarizing film and the optical film at the bonding to a polarizing film, so that point defects due to dusts can be effectively prevented.

The saponification treatment is preferably performed such that the surface of the transparent support on the side opposite the surface having the outermost layer has a contact angle with water of 400 or less, more preferably 300 or less, still more preferably 20° or less.

The specific method for the alkali saponification treatment can be selected from the following two methods (1) and (2). The method (I) is advantageous in that the treatment can be performed in the same step as that for general-purpose triacetyl cellulose film, but since the antireflection film surface is also saponified, the surface may be alkali-hydrolyzed to deteriorate the film or if the solution for saponification treatment remains, this causes a problem of staining. If the case is so, the method (2) is advantageous, though a special step for the treatment is necessary.

(1) After the formation of an low refractive index layer on the transparent support, the film is dipped at least once in an alkali solution, whereby the back surface of the film is saponified.

(2) Before or after the formation of an low refractive index layer on the transparent support an alkali solution is coated on the optical film surface on the side opposite the surface where the optical film is formed, and then the film is heated and washed with water and/or neutralized, whereby only the back surface of the film is saponified.

[Polarizing Plate]

The polarizing plate mainly comprises a polarizing film and two protective films sandwiching the polarizing film from both sides. The optical film of the present invention is preferably used for at least one protective film out of two protective films sandwiching the polarizing film from both sides. By arranging the optical film of the present invention to serve also as a protective film, the production cost of the polarizing plate can be reduced. Furthermore, by using the optical film of the present invention as the outermost surface layer, a polarizing plate prevented from the projection of outside light or the like and assured of excellent properties such as scratch resistance and antifouling property can be obtained.

As for the polarizing film, a known polarizing film or a polarizing film cut out from a lengthy polarizing film with the absorption axis of the polarizing film being neither parallel nor perpendicular to the longitudinal direction may be used. The lengthy polarizing film with the absorption axis of the polarizing film being neither parallel nor perpendicular to the longitudinal direction is produced by the following method.

This polarizing film is a polarizing film obtained by continuously feeding a polymer film and stretching the film while holding both edges of the film with holding means and applying a tension and can be produced according to a stretching method where the film is stretched at a stretching ratio of 1.1 to 20.0 at least in the film width direction, the holding devices at both edges of the film are moved to create a difference in the travelling speed of 3% or less in the longitudinal direction, and the film travelling direction is bent in the state of the film being held at both edges such that the angle made by the film travelling direction at the outlet in the step of holding both edges of the film and the substantial stretching direction of the film is inclined at 20 to 70°. Particularly, a polarizing film produced with an inclination angle of 450 is preferred in view of productivity.

The stretching method of a polymer film is described in detail in JP-A-2002-86554 (paragraphs [0020] to [0030]).

In the case of using the optical film of the present invention as a surface protective film on one side of the polarizing film, the optical film can be preferably used for a transmissive, reflective or transfective liquid crystal display device in a mode such as twisted nematic (TN) mode, super-twisted nematic (STN) mode, vertical alignment (VA) mode, in-plane switching (IPS) mode or optically compensated bend cell (OCB) mode.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) a (MVA-mode) liquid crystal cell where the VA mode is modified to a multi-domain system for enlarging the viewing angle (described in SID97 *Digest of Tech. Papers* (preprints), 28, 845 (1997)); (3) a (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

For the application to a VA-mode liquid crystal cell, a polarizing plate prepared by combining a biaxially stretched triacetyl cellulose film with the optical film of the present invention is preferred. As for the production method of a biaxially stretched triacetyl cellulose film, the method described, for example, in JP-A-2001-249223 and JP-A-2003-170492 is preferably used.

The OCB-mode liquid crystal cell is a liquid crystal display device using a liquid crystal cell of bend alignment mode where rod-like liquid crystalline molecules are aligned substantially in the reverse direction (symmetrically) between the upper part and the lower part of the liquid crystal cell, and this is disclosed in U.S. Pat. Nos. 4,583,825 and 5,410,422. Since rod-like liquid crystalline molecules are aligned symmetrically between the upper part and the lower part of the liquid crystal cell, the liquid crystal cell of bend alignment mode has a self-optically compensating ability. For this reason, this liquid crystal mode is also called an OCB (optically compensatory bend) liquid crystal mode. A liquid crystal display device of bend alignment mode is advantageous in that the response speed is fast.

In the ECB-mode liquid crystal cell, rod-like liquid crystalline molecules are oriented substantially in the horizontal alignment at the time of not applying a voltage. This is most popularly used as a color TFT liquid crystal display device and is described in a large number of publications such as *EL, PDP, LCD Display*, Toray Research Center (2001).

Particularly, in the case of a TN-mode or IPS-mode liquid crystal display device, as described, for example, in JP-A-2001-100043, an optical compensation film having an effect of enlarging the viewing angle is preferably used for the surface opposite the optical film of the present invention out of front and back two protective films of a polarizing film, because a polarizing plate having an antireflection effect and a viewing angle-enlarging effect with a thickness of one polarizing plate can be obtained.

EXAMPLES

Hereinafter, the present invention will be further described with the examples, but is not limited thereto. Otherwise specifically indicated, "parts" or "%" is based on mass standard.

Example 1

Silylation Treatment of Inorganic Oxide Fine Particle (Preparation of Liquid Dispersion A-1)

27.2 Parts (2.9 mol/silica surface area of 100 m$^2$ of silica sol) of trimethylmethoxysilane was added to 500 parts of a silica fine particle sol (silica sol in isopropyl alcohol, IPA-ST-L, produced by Nissan Chemical Industries, Ltd., average particle diameter: 45 nm, silica concentration: 30%) and mixed with stirring. Thereafter, reaction was allowed to proceed at 60° C. for 2 hours to obtain a silylation-treated silica sol. While adding methyl ethyl ketone to the silylation-treated silica sol, the solvent was displaced by reduced-pressure distillation at a pressure of 100 Torr such that the total liquid amount became constant. The residual isopropanol amount in the obtained liquid dispersion was analyzed by gas chromatography and found to be 1.0% or less. The silylation-treated silica sol after the displacement of solvent was adjusted to a solid content concentration of 30% with methyl ethyl ketone to obtain Liquid Dispersion A-1.

Liquid Dispersion A-1 was dried under reduced pressure at 50° C., then pulverized, further dried at 110° C. for 1 hour and subjected to elemental analysis, as a result, the carbon content was 0.62 wt % corresponding to, in terms of the number of trimethylsilyl groups, 1.72 per the surface area of 1 nm$^2$ of the silica fine particle. The number of silyl groups per the unit surface area was calculated by dividing the obtained value by the specific surface area of the fine particle determined by the BET method.

Liquid Dispersions A-2 to A-7 were prepared thoroughly in the same manner except that in Liquid Dispersion A-1, the silylation treating agent represented by formula (I), the silylation treatment time and the amount added of the silylation treating agent were changed as shown in Table 1. As for the number of silyl groups per the surface area of 1 nm$^2$ of the fine particle, the obtained liquid dispersion was evaluated in the same manner as above.

(Preparation of Liquid Dispersion B-1)

102.4 Parts (2.9 mmol/silica surface area of 100 m$^2$ of silica sol) of trimethylmethoxysilane was added to 500 parts of a silica fine particle sol (silica sol in isopropyl alcohol, IPA-ST, produced by Nissan Chemical Industries, Ltd., average particle diameter: 12 nm, silica concentration: 30%) and mixed with stirring. Thereafter, reaction was allowed to proceed at 60° C. for 2 hours to obtain a silylation-treated silica sol. While adding methyl ethyl ketone to the silylation-treated silica sol, the solvent was displaced by reduced-pressure distillation at a pressure of 100 Torr such that the total liquid amount became constant. The residual isopropanol amount in the obtained liquid dispersion was analyzed by gas chromatography and found to be 1.0% or less, The silylation-treated silica sol after the displacement of solvent was adjusted to a solid content concentration of 30% with methyl ethyl ketone to obtain Liquid Dispersion B-1.

Liquid Dispersion B-1 was dried under reduced pressure at 50° C., then pulverized, further dried at 110° C. for 1 hour and subjected to elemental analysis, as a result, the carbon content was 2.35 wt % corresponding to, in terms of the number of trimethylsilyl groups, 1.73 per the surface area of 1 nm$^2$ of the silica fine particle.

Liquid Dispersions B-2 to B-5 were prepared thoroughly in the same manner except that in Liquid Dispersion B-1, the silylation treating agent represented by formula (1), the silylation treatment time and the amount added of the silylation treating agent were changed as shown in Table 1. As for the number of silyl groups per the surface area of 1 nm$^2$ of the fine particle, the obtained liquid dispersion was evaluated in the same manner as above.

(Preparation of Liquid Dispersion C-1)

6.1 Parts (1.4 mmol/silica surface area of 100 m$^2$ of silica sol) of trimethylmethoxysilane was added to 500 parts of a silica fine particle sol (silica sol in isopropyl alcohol, IPA-ST-ZL, produced by Nissan Chemical Industries, Ltd., average particle diameter: 100 nm, silica concentration: 30%) and mixed with stirring. Thereafter, reaction was allowed to proceed at 60° C. for 2 hours to obtain a silylation-treated silica sol. While adding methyl ethyl ketone to the silylation-treated silica sol, the solvent was displaced by reduced-pressure distillation at a pressure of 100 Torr such that the total liquid amount became constant. The residual isopropanol amount in the obtained liquid dispersion was analyzed by gas chromatography and found to be 1.0% or less. The silylation-treated silica sol after the displacement of solvent was adjusted to a solid content concentration of 30% with methyl ethyl ketone to obtain Liquid Dispersion C-1.

Liquid Dispersion C-1 was dried under reduced pressure at 50° C., then pulverized, further dried at 110° C. for 1 hour and subjected to elemental analysis, as a result, the carbon content was 0.26 wt % corresponding to, in terms of the number of trimethylsilyl groups, 1.62 per the surface area of 1 $nm^2$ of the silica fine particle.

(Preparation of Liquid Dispersion D-1)

25 Parts (2.9 mmol/hollow silica surface area of 100 $m^2$ of hollow silica sol) of trimethylmethoxysilane was added to 500 parts of a hollow silica fine particle sol (silica sol in isopropyl alcohol, CS60-IPA, produced by Catalysts & Chemicals Ind. Co., Ltd., average particle diameter: 60 nm, shell thickness: 10 nm, silica concentration: 20%) and mixed with stirring. Thereafter, reaction was allowed to proceed at 60° C. for 2 hours to obtain a silylation-treated silica sol. While adding methyl ethyl ketone to the silylation-treated silica sol, the solvent was displaced by reduced-pressure distillation at a pressure of 100 Torr such that the total liquid amount became constant. The residual isopropanol amount in the obtained liquid dispersion was analyzed by gas chromatography and found to be 1.0% or less. The silylation-treated silica sol after the displacement of solvent was adjusted to a solid content concentration of 30% with methyl ethyl ketone to obtain Liquid Dispersion D-1.

Liquid Dispersion D-1 was dried under reduced pressure at 50° C., then pulverized, further dried at 110° C. for 1 hour and subjected to elemental analysis, as a result, the carbon content was 0.88 wt % corresponding to, in terms of the number of trimethylsilyl groups, 1.76 per the surface area of 1 $nm^2$ of the silica fine particle.

Liquid Dispersions D-2 to D4 were prepared thoroughly in the same manner except that in Liquid Dispersion D-1, the silylation treating agent represented by formula (I), the silylation treatment time and the amount added of the silylation treating agent were changed as shown in Table 1. As for the number of silyl groups per the surface area of 1 $nm^2$ of the fine particle, the obtained liquid dispersion was evaluated in the same manner as above.

(Preparation of Liquid Dispersion E-1)

49 Parts (2.9 mmol/zirconium oxide surface area of 100 $m^2$ of zirconium oxide sol) of trimethylmethoxysilane was added to 500 parts of a zirconium oxide fine particle sol (zirconium oxide sol in methyl ethyl ketone, produced by Sumitomo Osaka Cement Co., Ltd., average particle diameter: 10 nm, zirconium oxide concentration: 30%) and mixed with stirring. Thereafter, reaction was allowed to proceed at 60° C. for 2 hours to obtain a silylation-treated zirconium oxide sol. This silylation-treated zirconium oxide sol was adjusted to a solid content concentration of 30% with methyl ethyl ketone to obtain Liquid Dispersion E-1.

Liquid Dispersion E-1 was dried under reduced pressure at 50° C., then pulverized, further dried at 110° C. for 1 hour and subjected to elemental analysis, as a result, the carbon content was 1.15 wt % corresponding to, in terms of the number of trimethylsilyl groups, 1.76 per the surface area of 1 $nm^2$ of the silica fine particle.

Liquid Dispersions E-2 to & 5 were prepared thoroughly in the same manner except that in Liquid Dispersion E-1, the silylation treating agent represented by formula (I), the silylation treatment time and the amount added of the silylation treating agent were changed as shown in Table 1. As for the number of silyl groups per the surface area of 1 $nm^2$ of the fine particle, the obtained liquid dispersion was evaluated in the same manner as above.

(Preparation of Liquid Dispersions F-1 and F-2)

A silica fine particle (7.5 kg) (KE-P150, produced by Nippon Shokubai Co., Ltd., refractive index: 1.46, average particle diameter: 1.5 μm) was added to 17.5 kg of methyl ethyl ketone and dispersed by a polytron at a rotation number of 5,000 rpm for 3 hours at room temperature to obtain MEK Dispersion F-1 of Silica Fine Particle. Subsequently, 1.84 parts (2.9 mmol/silica surface area of 100 $m^2$) of acryloyloxypropyltrimethoxysilane was added to 500 parts of M Dispersion F-1 of Silica Fine Particle (average particle diameter: 1.5 μm, silica concentration: 30%) and mixed with stirring. Thereafter, reaction was allowed to proceed at 60° C. for 8 hours to obtain a silylation-treated silica liquid dispersion. This silylation-treated silica liquid dispersion was adjusted to a solid content concentration of 30% with methyl ethyl ketone to obtain Liquid Dispersion F-2.

Liquid Dispersion F-2 was dried under reduced pressure at 50° C., then pulverized, further dried at 110° C. for 1 hour and subjected to elemental analysis, as a result, the carbon content was 0.04 wt % corresponding to, in terms of the number of acryloyloxypropylsilyl groups, 1.84 per the surface area of 1 $nm^2$ of the silica fine particle.

(Preparation of Liquid Dispersions G-1 and G-2)

A silica fine particle (7.5 kg) (KE-P250, produced by Nippon Shokubai Co., Ltd., refractive index: 1.46, average particle diameter: 2.5 μm) was added to 17.5 kg of toluene and dispersed by a polytron at a rotation number of 5,000 rpm for 3 hours at room temperature to obtain Toluene Dispersion G-1 of Silica Fine Particle. Subsequently, 0.49 parts (2.9 mmol/silica surface area of 100 $m^2$) of trimethylmethoxysilane was added to 500 parts of Toluene Dispersion G-1 of Silica Fine Particle (average particle diameter: 2.5 μm, silica concentration: 30%) and mixed with stirring. Thereafter, reaction was allowed to proceed at 60° C. for 2 hours to obtain a silylation-treated silica liquid dispersion. This silylation-treated silica liquid dispersion was adjusted to a solid content concentration of 30% with toluene to obtain Liquid Dispersion G-2.

Liquid Dispersion G-2 was dried under reduced pressure at 50° C., then pulverized, further dried at 110° C. for 1 hour and subjected to elemental analysis, as a result, the carbon content was 0.03 wt % corresponding to, in terms of the number of trimethylsilyl groups, 2.30 per the surface area of 1 $nm^2$ of the silica fine particle.

(Evaluation of Foreign Matter in Liquid Dispersion)

Liquid Dispersions (A-1) to (A-7), (B-1) to (B-5), (C-1), (D-1) to (D4), (E-1) to (E-5), (F-1), (F-2), (G-1) and (G-2) each (10 ml) was sampled in a test tube having a diameter of 10 mm, and any foreign matter was inspected with an eye. The degree of generation of foreign matter observable with an eye was evaluated according to the following criteria.

◯: No foreign matter was observed.

Δ: Foreign matter was slightly observed but an aggregated precipitate was not present.

×: Foreign matter was obviously observed and an aggregated precipitate was present.

TABLE 1

| | Inorganic Oxide Fine Particle | Silylation Treating Agent | Silylation Treatment Temperature/Time | Amount Added of Silylation Treating Agent (mmol/surface area of 100 $m^2$ of fine particle) | Number of Silyl Groups (groups/surface area of 1 $nm^2$ of fine particle) | Foreign Matter |
|---|---|---|---|---|---|---|
| A-1 | 45-nm silica | trimethylmethoxysilane | 60° C./2 hours | 2.9 | 1.72 | ○ |
| A-2 | " | " | " | 1.4 | 1.60 | ○ |
| A-3 | " | " | " | 0.7 | 1.42 | ○ |
| A-4 | " | " | " | 0.4 | 1.19 | Δ |
| A-5 | " | acryloyloxypropyl-trimethoxysilane | 60° C./8 hours | 2.9 | 1.52 | ○ |
| A-6 | " | acryloyloxypropyl-trimethoxysilane | " | 2.1 | 1.24 | Δ |
| A-7 | " | none | none | 0.0 | 0.00 | X |
| B-1 | 12-nm silica | trimethylmethoxysilane | 60° C./2 hours | 2.9 | 1.73 | ○ |
| B-2 | " | " | " | 1.4 | 1.61 | ○ |
| B-3 | " | " | " | 0.4 | 1.20 | Δ |
| B-4 | " | acryloyloxypropyl-trimethoxysilane | 60° C./8 hours | 2.9 | 1.47 | ○ |
| B-5 | " | acryloyloxypropyl-trimethoxysilane | " | 0.6 | 1.03 | Δ |
| C-1 | 100-nm silica | trimethylmethoxysilane | 60° C./2 hours | 1.4 | 1.62 | ○ |
| D-1 | 60-nm hollow silica | trimethylmethoxysilane | 60° C./2 hours | 2.9 | 1.76 | ○ |
| D-2 | " | " | " | 1.4 | 1.58 | ○ |
| D-3 | " | acryloyloxypropyl-trimethoxysilane | 60° C./8 hours | 2.9 | 1.50 | ○ |
| D-4 | " | acryloyloxypropyl-trimethoxysilane | " | 1.5 | 1.20 | Δ |
| E-1 | 10-nm zirconium oxide | trimethylmethoxysilane | 60° C./2 hours | 2.9 | 1.76 | ○ |
| E-2 | " | " | " | 1.4 | 1.64 | ○ |
| E-3 | " | acryloyloxypropyl-trimethoxysilane | 60° C./8 hours | 2.9 | 1.46 | ○ |
| E-4 | " | acryloyloxypropyl-trimethoxysilane | " | 1.2 | 1.13 | Δ |
| E-5 | " | none | none | 0.0 | 0.00 | X |
| F-1 | 1.5-μm silica | none | none | 0.0 | 0.00 | X |
| F-2 | " | acryloyloxypropyl-trimethoxysilane | 60° C./8 hours | 2.9 | 1.84 | ○ |
| G-1 | 2.5-μm silica | none | none | 0.0 | 0.00 | X |
| G-2 | " | trimethylmethoxysilane | 60° C./2 hours | 2.9 | 2.30 | ○ |

Example 2

Preparation of Coating Solution (a-1) for Forming Antiglare Hard Coat Layer

A mixture (50 kg) of pentaerythritol triacrylate and pentaerythritol tetraacrylate (PET-30, produced by Nippon Kayaku Co., Ltd.) was diluted with 38.5 kg of toluene, and 2 kg of a polymerization initiator (Irgacure 184, produced by Ciba Specialties Chemicals) was added thereto and mixed with stirring. To this solution, 1.5 kg of a 30% toluene liquid dispersion of crosslinked polystyrene particles (SX-350, produced by Soken Kagaku K. K., refractive index: 1.60) having an average particle diameter of 3.5 gum after dispersion by a polytron disperser at 10,000 rpm for 20 minutes and 13.0 kg of a 30% toluene liquid dispersion of crosslinked acrylate-styrene particles (produced by Soken Kagaku K. K., refractive index: 1.55) having an average particle diameter of 3.5 μm were added and finally, 0.75 kg of a fluorine-based surface modifier FP-132) shown by the chemical formula below and 10 kg of a silane coupling agent (KBM-5103, produced by Shin-Etsu Chemical Co., Ltd.) were added, thereby completing the solution.

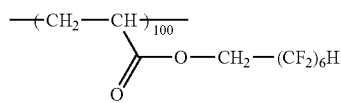

The resulting mixed solution was filtered through a polypropylene-made filter having a pore size of 30 μm to prepare Coating Solution (a-1) for Forming Antiglare Hard Coat Layer.

(Preparation of Coating Solution (b-1) for Forming Antiglare Hard Coat Layer)

A mixture (50 kg) of pentaerythritol triacrylate and pentaerythritol tetraacrylate (PET-30, produced by Nippon Kayaku Co., Ltd.) was diluted with 115.5 kg of toluene, and 2 kg of a polymerization initiator (Irgacure 184, produced by Ciba Specialties Chemicals) was added thereto and mixed with stirring. To this solution, 14.5 kg of Liquid Dispersion (G-2) of 2.5-μm silica fine particles was added and finally, 0.75 kg of a fluorine-based surface modifier (FP-132) shown by the chemical formula below and 10 kg of a silane coupling agent (KBM-5103, produced by Shin-Etsu Chemical Co., Ltd.) were added, thereby completing the solution.

The resulting mixed solution was filtered through a polypropylene-made filter having a pore size of 30 μm to prepare Coating Solution (b-1) for Forming Antiglare Hard Coat Layer.

Also, Coating Solution (b-2) for Forming Antiglare Hard Coat Layer was prepared thoroughly in the same manner except that in Coating Solution (b-1) for Forming Antiglare Hard Coat Layer, Liquid Dispersion (G-2) of 2.5-μm silica fine particles was changed to (G-1).

(Preparation of Coating Solution (c-1) for Forming Light-Diffusing Hard Coat Layer)

A mixture (50 kg) of dipentaerythritol pentaacrylate and dipentaerythritol hexaacrylate (DPHA, produced by Nippon Kayaku Co., Ltd.) and 146 kg of Liquid Dispersion (E-1) of 10-nm zirconium oxide fine particles were added, and 2 kg of a polymerization initiator (a 2:1 (by mass) mixture of Irgacure 184 and Irgacure 907, produced by Ciba Specialties Chemicals) was added thereto and mixed with stirring. While adding methyl isobutyl ketone to this solution, distillation under pressure was performed to adjust the weight ratio of methyl isobutyl ketone and methyl ethyl ketone to 90:10 and the solid content of the solution to 70 wt %, whereby a zirconium oxide fine particle-containing hard coat agent was obtained. To 131 kg of this zirconium oxide fine particle-containing hard coat agent, 11.3 kg of a 30% methyl isobutyl ketone liquid dispersion of crosslinked acrylate particles (MXS-300, produced by Soken Kagaku K. K., refractive index: 1.49) having a particle diameter of 3.0 µm after dispersion by a polytron disperser at 5,000 rpm for 3 hours and 29.7 kg of Liquid Dispersion (F-2) of 1.5-µm silica fine particles were added and finally, 8.2 kg of methyl ethyl ketone, 5.1 kg of methyl isobutyl ketone and 10 kg of a silane coupling agent (KBM-5103, produced by Shin-Etsu Chemical Co., Ltd.) were added, thereby completing the solution.

The resulting mixed solution was filtered through a polypropylene-made filter having a pore size of 30 µm to prepare Coating Solution (c-1) for Forming Light-Diffusing Hard Coat Layer.

Coating Solutions (c-2) to (c-5) for Forming Light-Diffusing Hard Coat Layer were prepared thoroughly in the same manner except that in Coating Solution (c-1) for Forming Light-Diffusing Hard Coat Layer, Liquid Dispersion (E-1) of 10-nm zirconium oxide fine particles was changed to (E-2) to (E-5), respectively.

Also, Coating Solution (c-6) for Forming Light-Diffusing Hard Coat Layer was prepared thoroughly in the same manner except that in Coating Solution (c-1) for Forming Light-Diffusing Hard Coat Layer, Liquid Dispersion (F-2) of 1.5-µm silica fine particles was changed to (F-1).

Coating Solutions (c-2) to (c-3) for Forming Light-Diffusing Hard Coat Layer were prepared thoroughly in the same manner except that in Coating Solution (c-1) for Forming Light-Diffusing Hard Coat Layer, 10 nm Zirconium Fine Particle Dispersion (E-1) was changed to (E-2) to (E3).

And, Coating Solution (c-4) for Forming Light-Diffusing Hard Coat Layer was prepared thoroughly in the same manner except that in Coating Solution (c-1) for Forming Light-Diffusing Hard Coat Layer, 10 nm Zirconium Fine Particle Dispersion (E-1) was changed to (E-4) and 1.5 µm Silica Fine Particle Dispersion (F-2) was changed to (F-1).

Further, Coating Solution (c-5) for Forming Light-Diffusing Hard Coat Layer was prepared thoroughly in the same manner except that in Coating Solution (c-1) for Forming Light-Diffusing Hard Coat Layer, 10 nm Zirconium Fine Particle Dispersion (E-1) was changed to (E-5) and 1.5 µm Silica Fine Particle Dispersion (F-2) was changed to (F-1).

(Preparation of Sol Solution a)

In a reactor equipped with a stirrer and a reflux condenser, 120 parts of methyl ethyl ketone, 100 parts of acryloyloxypropyltrimethoxysilane (KBM5103 (trade name), produced by Shin-Etsu Chemical Co., Ltd.) and 3 parts of diisopropoxyaluminum ethyl acetoacetate were added and mixed, and 30 parts of ion exchanged water was added thereto. After allowing the reaction to proceed at 60° C. for 4 hours, the reaction solution was cooled to room temperature to obtain Sol Solution a. The mass average molecular weight was 1,800 and the proportion of the components having a molecular weight of 1,000 to 20,000 in the components not smaller than the oligomer component was 100%. The analysis by gas chromatography revealed that the raw material acryloyloxypropyltrimethoxysilane was not remaining at all.

(Preparation of Composition (d-1) for Forming Low Refractive Index Layer)

Methyl ethyl ketone (6.1 kg), 1.2 kg of cyclohexanone, 3.1 kg of Liquid Dispersion (A-1) of 45-nm silica fine particles and 1.5 kg of Sol Solution a were added to 30 kg of a thermal crosslinking fluorine-containing polymer having a refractive index of 1.44 (JTA113, produced by JSR Corp., solid content concentration: 6%, main solvent: methyl ethyl ketone) and after stirring the resulting solution was filtered through a polypropylene-made filter having a pore size of 1 µm to prepare Composition (d-1) for Forming Low Refractive Index Layer.

Coating Solutions (d-2) to (d-7) for Forming Low Refractive Index Layer were prepared thoroughly in the same manner except that in Composition (d-1) for Forming Low Refractive Index Layer, Liquid Dispersion (A-1) of 45-nm silica fine particles was changed to (A-2) to (A-7), respectively.

Also, Coating Solution (d-8) for Forming Low Refractive Index Layer was prepared thoroughly in the same manner except that in Composition (d-1) for Forming Low Refractive Index Layer, Liquid Dispersion (A-1) of 45-nm silica fine particles was changed to Liquid Dispersion (C-1) of 100-nm silica fine particles.

Furthermore, Coating Solution (d-9) for Forming Low Refractive Index Layer was prepared thoroughly in the same manner except that in Coating Solution (d-1) for Forming Low Refractive Index Layer, Liquid Dispersion (A-1) of 45-nm silica fine particles was changed to Liquid Dispersion (D-2) of 60-nm hollow silica fine particles.

(Preparation of Composition (e-1) for Forming Low Refractive Index Layer)

Methyl ethyl ketone (2.8 kg), 1.1 kg of cyclohexanone, 1.5 kg of Liquid Dispersion (A-2) of 45-nm silica fine particles, 1.3 kg of Liquid Dispersion (B-2) of 12-nm silica fine particles and 0.6 kg of Sol Solution a were added to 30 kg of a thermal crosslinking fluorine-containing polymer having a refractive index of 1.42 (JN7228A, produced by JSR Corp., solid content concentration: 6%, main solvent: methyl ethyl ketone) and after stirring, the resulting solution was filtered through a polypropylene-made filter having a pore size of 1 µm to prepare Composition (e-1) for Forming Low Refractive Index Layer.

(Preparation of Composition for Forming Low Refractive Index Layer (e-1))

To 30 kg of a thermally curable fluorine-containing polymer with a refractive index of 1.42 (JN 7228A, solid concentration=6%, main solvent=methyl ethyl ketone, a product of JSR Corp.), 2.8 kg of methyl ethyl ketone, 1.1 kg of cyclohexanone, 1.5 kg of 45 nm Silica Fine Particle Dispersion (A-2), 1.3 kg of 12 nm Silica Fine Particle Dispersion (B-2) and 0.6 kg of Sol Solution a were added, and after stirring, the mixture was filtered through a polypropylene filter with a pore size of 1 µm to prepare Composition (e-1) for Forming Low Refractive Index Layer.

Composition (e-2) Forming Low Refractive Index Layer was prepared thoroughly in the same manner except that in Composition (e-1) for Forming Low Refractive Index Layer 45 nm Silica Fine Particle Dispersion (A-2) was changed to (A-6) and 12 nm Silica Fine Particle dispersion (B-2) was changed to (B-3).

Further, Composition (e-3) for low refractive index layer formation was prepared thoroughly in the same manner except that in Composition (e-1) for Forming Low Refractive Index Layer 45 nm Silica Fine Particle Dispersion (A-2) was changed to (A-4) and 12 nm Silica Fine Particle Dispersion (B-2) was changed to (B-5).

Still farther, Composition (e-4) for Forming Low Refractive Index Layer was prepared thoroughly in the same manner except that, in Composition (e-1) for Forming Low Refractive Index Layer, 45 nm Silica Fine Particle Dispersion (A-2) was changed to (A-4) and 12 nm Silica Fine Particle Dispersion (B-2) was changed to (B-3).

In addition, Composition (e-5) for Forming Low Refractive Index Layer was prepared thoroughly in the same manner except that, in Composition (e-1) for Forming Low Refractive Index Layer, 12 nm Silica Fine Particle Dispersion (B-2) was changed to (B-5).

(Preparation of Composition (f-1) for Forming Low Refractive Index Layer) Methyl ethyl ketone (4.2 kg), 0.8 kg of cyclohexanone and 1.5 kg of Sol Solution a were added to 30 kg of a thermal crosslinking fluorine-containing polymer having a refractive index of 1.44 (JTA113B, produced by JSR Corp., solid content concentration: 6%, main solvent: methyl ethyl ketone) and after stirring, the resulting solution was filtered through a polypropylene-made filter having a pore size of 1 μm to prepare Composition (f-1) for Forming Low Refractive Index Layer.

(Preparation of Compositions (g-1) and (h-1) for Forming Low Refractive Index Layer)

Composition (g-1) for Forming Low Refractive Index Layer was prepared thoroughly in the same manner except that, in Composition (d-1) for Forming Low Refractive Index Layer, 68 g of Initiator Compound (IC-1) below was added.

Moreover, Composition (h-1) for Forming Low Refractive Index Layer was prepared thoroughly in the same manner except that, in Composition (e-1) for Forming Low Refractive Index Layer, 68 g of Initiator Compound (IC-1) below was added.

Incidentally, the SP value of Initiator Compound (IC-1) is 29.1, the SP value of the fluorine-containing polymer (JTA113B) is 18.2, and the SP value of the organosilane compound (Sol a) is 22.4.

Initiator Compound (IC-1)

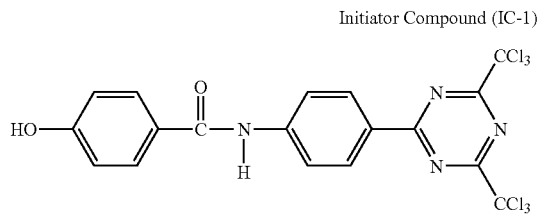

Example 3

Production and Evaluation of Hard Coat Layer and Antireflection Film Sample Nos. 1-3, 5, 8, 10, 11, 13, 15 to 17, 22 to 25 of the Invention and Comparative Sample Nos. 4, 6, 7, 9, 12, 14 and 18 to 21

(Coating of Hard Coat Layer)

A 80 μm-thick triacetyl cellulose film (TAC-TD80U, produced by Fuji Photo Film Co., Ltd.) in a roll form was unrolled as the transparent support, and the coating solution for forming hard coat layer (antiglare hard coat layer or light-diffusing hard coat layer) shown in Table 2 was coated directly thereon by using a doctor blade and a microgravure roll having a diameter of 50 mm and having a gravure pattern with a line number of 135 lines/inch and a depth of 60 μm under the conditions such that the transportation speed was 10 m/min, and after drying at 60° C. for 150 seconds, irradiated with an ultraviolet ray at an illumination intensity of 400 mW/cm$^2$ and an irradiation dose of 250 mJ/cm$^2$ by using an air-cooled metal halide lamp of 160 W/cm (manufactured by Eyegraphics Co., Ltd.) under nitrogen purging, thereby curing the coated layer to form an antiglare hard coat layer or a light-diffusing hard coat layer. The resulting film was taken up. The thickness of the hard coat layer was 6 μm when Coating Solution (a-1) for Forming Antiglare Hard Coat Layer was coated, 2.3 μm when Coating Solution (b-1) or (b-2) for Forming Antiglare Hard Coat Layer was coated, and 3.4 μm when any one of Coating Solutions (c-1) to (c-5) for Forming Light-Diffusing Hard Coat Layer was coated.

(Coating of Low Refractive Index Layer)

The triacetyl cellulose film having coated thereon the hard coat layer was again unrolled, and the coating solution for forming low refractive index layer prepared above was coated thereon by using a doctor blade and a microgravure roll having a diameter of 50 mm and having a gravure pattern with a line number of 200 lines/inch and a depth of 30 μm under the conditions such that the transportation speed was 20 m/min, and after drying at 120° C. for 75 seconds and further drying for 10 minutes, irradiated with an ultraviolet ray at an illumination intensity of 400 mW/cm$^2$ and an irradiation dose of 240 mJ/cm$^2$ by using an air-cooled metal halide lamp of 240 W/cm (manufactured by Eyegraphics Co., Ltd.) under nitrogen purging, thereby forming a low refractive index layer having a thickness of 100 nm. The resulting film was taken up.

(Preparation of Hard Coat Film and Antireflection Film Samples)

As shown in Table 2, hard coat film and antireflection film samples were produced by the above-described method.

TABLE 2

| | Hard Coat Layer | | | Low Refractive Index Layer | | |
|---|---|---|---|---|---|---|
| Sample No. | Coating Solution | Liquid Dispersion of Inorganic Oxide Fine Particles Contained | Number of Silyl Groups on Surface of Inorganic Oxide Fine Particle Contained | Coating Solution | Liquid Dispersion of Inorganic Oxide Fine Particles Contained | Number of Silyl Groups on Surface of Inorganic Oxide Fine Particle Contained |
| 1 (Invention) | a-1 | — | — | d-1 | A-1 (45-nm SiO$_2$) | 1.72 |
| 2 (Invention) | " | " | " | d-2 | A-2 (45-nm SiO$_2$) | 1.60 |
| 3 (Invention) | " | " | " | d-3 | A-3 (45-nm SiO$_2$) | 1.42 |
| 4 (Comparative Example) | " | " | " | d-4 | A-4 (45-nm SiO$_2$) | 1.19 |
| 5 (Invention) | " | " | " | d-5 | A-5 (45-nm SiO$_2$) | 1.52 |

TABLE 2-continued

| Sample No. | | | | | | |
|---|---|---|---|---|---|---|
| 6 (Comparative Example) | " | " | " | d-6 | A-6 (45-nm SiO$_2$) | 1.24 |
| 7 (Comparative Example) | " | " | " | d-7 | A-7 (45-nm SiO$_2$) | 0.00 |
| 8 (Invention) | " | " | " | d-8 | C-1 (100-nm SiO$_2$) | 1.62 |
| 9 (Comparative Example) | " | " | " | f-1 | — | — |
| 10 (Invention) | " | " | " | d-9 | D-2 (60-nm hollow SiO$_2$) | 1.58 |
| 11 (Invention) | b-1 | G-2 (2.5-μm SiO$_2$) | 2.30 | d-2 | A-2 (45-nm SiO$_2$) | 1.60 |
| 12 (Comparative Example) | b-2 | G-1 (2.5-μm SiO$_2$) | 0.00 | d-4 | A-4 (45-nm SiO$_2$) | 1.19 |
| 13 (Invention) | b-1 | G-2 (2.5-μm SiO$_2$) | 2.30 | " | — | — |
| 14 (Comparative Example) | b-2 | G-1 (2.5-μm SiO$_2$) | 0.00 | " | — | — |
| 15 (Invention) | c-1 | E-1 (10-nm ZrO$_2$) | 1.76 | e-1 | A-2 (45-nm SiO$_2$) | 1.60 |
|  |  | F-2 (1.5-μm SiO$_2$) | 1.84 |  | B-2 (12-nm SiO$_2$) | 1.61 |
| 16 (Invention) | c-2 | E-2 (10-nm ZrO$_2$) | 1.64 | " | " | " |
|  |  | F-2 (1.5-μm SiO$_2$) | 1.84 |  |  |  |
| 17 (Invention) | c-3 | E-3 (10-nm ZrO$_2$) | 1.46 | " | " | " |
|  |  | F-2 (1.5-μm SiO$_2$) | 1.84 |  |  |  |
| 18 (Comparative Example) | c-4 | E-4 (10-nm ZrO$_2$) | 1.13 | e-2 | A-6 (45-nm SiO$_2$) | 1.24 |
|  |  | F-1 (1.5-μm SiO$_2$) | 0.00 |  | B-3 (12-nm SiO$_2$) | 1.20 |
| 19 (Comparative Example) | c-5 | E-5 (10-nm ZrO$_2$) | 0.00 | e-3 | A-4 (45-nm SiO$_2$) | 1.19 |
|  |  | F-1 (1.5-μm SiO$_2$) | 0.00 |  | B-5 (12-nm SiO$_2$) | 1.03 |
| 20 (Comparative Example) | c-4 | E-4 (10-nm ZrO$_2$) | 1.13 | e-3 | A-4 (45-nm SiO$_2$) | 1.19 |
|  |  | F-1 (1.5-μm SiO$_2$) | 0.00 |  | B-5 (12-nm SiO$_2$) | 1.03 |
| 21 (Comparative Example) | c-5 | E-5 (10-nm ZrO$_2$) | 0.00 | e-4 | A-4 (45-nm SiO$_2$) | 1.19 |
|  |  | F-1 (1.5-μm SiO$_2$) | 0.00 |  | B-3 (12-nm SiO$_2$) | 1.20 |
| 22 (Invention) | c-4 | E-4 (10-nm ZrO$_2$) | 1.13 | e-1 | A-2 (45-nm SiO$_2$) | 1.60 |
|  |  | F-1 (1.5-μm SiO$_2$) | 0 |  | B-2 (12-nm SiO$_2$) | 1.61 |
| 23 (Invention) | c-4 | E-4 (10-nm ZrO$_2$) | 1.13 | e-5 | A-2 (45-nm SiO$_2$) | 1.60 |
|  |  | F-1 (1.5-μm SiO$_2$) | 0 |  | B-5 (12-nm SiO$_2$) | 1.03 |
| 24 (Invention) | a-1 | — | — | g-1 | A-1 (45-nm SiO$_2$) | 1.72 |
| 25 (Invention) | c-1 | E-1 (10-nm ZrO$_2$) | 1.76 | h-1 | A-2 (45-nm SiO$_2$) | 1.60 |
|  |  | F-2 (1.5-μm SiO$_2$) | 1.84 |  | B-2 (12-nm SiO$_2$) | 1.61 |

| Sample No. | Point Defects | Coating Unevenness | Fine Net-Like Aggregation | Average Reflectance | Steel Wool Rubbing | Wet Cotton Swab Rubbing | Eraser Rubbing |
|---|---|---|---|---|---|---|---|
| 1 (Invention) | ⊚ | ⊚ | ⊚ | 1.7 | ○ | ⊚ | ⊚ |
| 2 (Invention) | ⊚ | ⊚ | ⊚ | 1.8 | ○ | ⊚ | ⊚ |
| 3 (Invention) | ⊚ | ○ | Δ | 1.9 | ○ | ⊚ | ⊚ |
| 4 (Comparative Example) | ⊚ | X | X | 2.0 | ○ | ⊚ | ⊚ |
| 5 (Invention) | ⊚ | ⊚ | ○ | 1.8 | ⊚ | ⊚ | ⊚ |
| 6 (Comparative Example) | ⊚ | Δ | X | 2.0 | ⊚ | ⊚ | ⊚ |
| 7 (Comparative Example) | X | X | X X | 2.2 | ○ | ⊚ | ⊚ |
| 8 (Invention) | ⊚ | ⊚ | ⊚ | 1.8 | ⊚ | ⊚ | ⊚ |
| 9 (Comparative Example) | ⊚ | ⊚ | — | 1.7 | X | X | X |
| 10 (Invention) | ⊚ | ⊚ | ○ | 1.6 | ○ | ⊚ | ⊚ |
| 11 (Invention) | ⊚ | ⊚ | ⊚ | 1.8 | ○ | ⊚ | ⊚ |
| 12 (Comparative Example) | ⊚ | Δ | X | 2.0 | ○ | ⊚ | ⊚ |
| 13 (Invention) | ⊚ | ⊚ | — | 3.5 | ○ | ⊚ | ⊚ |
| 14 Comparative Example) | X | ⊚ | — | 3.7 | ○ | ⊚ | ⊚ |
| 15 (Invention) | ⊚ | ⊚ | ⊚ | 1.4 | ○ | ⊚ | ⊚ |
| 16 (Invention) | ⊚ | ⊚ | ⊚ | 1.4 | ○ | ⊚ | ⊚ |
| 17 (Invention) | ○ | ⊚ | ⊚ | 1.4 | ○ | ⊚ | ⊚ |
| 18 (Comparative Example) | X | ⊚ | ⊚ | 1.4 | ○ | ⊚ | ⊚ |
| 19 (Comparative Example) | X | ⊚ | ⊚ | 1.4 | ○ | ⊚ | ⊚ |
| 20 (Comparative Example) | X | ⊚ | ⊚ | 1.4 | ○ | ⊚ | ⊚ |
| 21 (Comparative Example) | X | ⊚ | Δ | 1.5 | ○ | X | ⊚ |
| 22 (Invention) | ⊚ | ⊚ | ⊚ | 1.4 | ○ | ⊚ | ⊚ |
| 23 (Invention) | ○ | ⊚ | ○ | 1.4 | ○ | ⊚ | ⊚ |
| 24 (Invention) | ⊚ | ⊚ | ⊚ | 1.7 | ⊚ | ⊚ | ⊚ |
| 25 (Invention) | ⊚ | ⊚ | ⊚ | 1.4 | ⊚ | ⊚ | ⊚ |

(Saponification Treatment of Hard Coat Film and Antireflection Film)

After the film formation, samples each was subjected to the following treatment. An aqueous 1.5 mol/liter sodium hydroxide solution was prepared and kept at 55° C. Separately, an aqueous 0.01 mol/liter dilute sulfuric acid solution was prepared and kept at 35° C. The produced sample was dipped in the aqueous sodium hydroxide solution for 2 minutes and then dipped in water to thoroughly wash out the aqueous sodium hydroxide solution. Subsequently, the sample was dipped in the aqueous dilute sulfuric acid solution for 1 minute and then dipped in water to thoroughly wash out the aqueous dilute sulfuric acid solution. Finally, the sample was thoroughly dried at 120° C. In this way, a saponified hard coat film or antireflection film was produced.

(Evaluation of Hard Coat Film and Antireflection Film)

The samples obtained each was evaluated on the following items. The results are shown in Table 2.

(1) Evaluation of Film Surface State

A sample in a size of 1.34 m×5.00 m was observed by the transmitted light with an eye, and the number of point defects-due to aggregation of inorganic oxide fine particles was counted.

⊚: 0

○: 1

Δ: from 2 to 5

×: from 6 to 9

× ×: 11 or more

An oily black ink was painted on the sample on the side where the optical functional group was not provided, and observed by the reflected light with an eye, and the degree of coating unevenness was evaluated according to the following criteria.

⊚: Unevenness was not observed at all even by very careful observation

○: Weak unevenness was slightly observed by very careful observation.

Δ: Weak unevenness was observed.

×: Unevenness of medium degree was observed.

× ×: Unevenness was observed at the first glance.

(2) Observation of Aggregation of Fine Particles

The coated surface side of each of Samples 1 to 8, 10 to 12 and 15 to 25 (samples where a coating solution for low refractive index layer containing an inorganic oxide fine particle was coated) was observed by an electron microscope at a magnification of 5,000, and the degree of net-like aggregation of fine particles was evaluated according to the following criteria.

⊚: Net-like aggregation of fine particles was not observed at all.

○: Small aggregation of fine particles was slightly observed but not expanded like a net.

Δ: Weak net-like aggregation of fine particles was observed.

×: Thin net-like aggregation of fine particles was clearly observed.

× ×: Thick net-like aggregation of fine particles was clearly observed.

(3) Evaluation of Average Reflectance

A specular reflectance of light at an incidence angle of 5° in the wavelength region of 380 to 780 nm was measured at an outgoing angle of −5' by a spectrophotometer V-550 (manufactured by JASCO Corp.) equipped with an adapter ARV-474. The average reflectance at 450 to 650 nm was calculated and used for the evaluation of antireflectivity.

(4) Evaluation of Steel Wool Rubbing Resistance

A rubbing test was performed by using a rubbing tester under the following conditions.

Environmental conditions of evaluation: 25° C. and 60% RH

Rubbing material:

A steel wool (Grade No. 0000, manufactured by Nippon Steel Wool K.K.) was wound around the rubbing tip (1 cm×1 cm) of the tester coming into contact with the sample and fixed by a band to resist movement.

Moving distance (one way): 13 cm

Rubbing rate: 13 cm/sec

Load: 500 g/cm$^2$

Contact area of tip: 1 cm×1 cm

Number of rubbings: 10 reciprocations

An oily black ink was painted on the back side of the rubbed sample and observed by the reflected light with an eye, and the abrasion on the rubbed portion was evaluated according to the following criteria.

⊚: Scratches were not observed at all even by very careful observation.

○: Faint scratches were slightly observed by very careful observation.

Δ: Faint scratches were observed.

×: Scratches of medium degree were observed.

× ×: Scratches were observed at the first glance.

(5) Evaluation of Wet Cotton Swab Rubbing Resistance

A cotton swab was fixed to the rubbing tip of a rubbing tester, the sample was fixed at its top and bottom by clips in a flat dish, the sample and the cotton swab were dipped in water at 25° C. at room temperature of 25° C., and a load of 500 g was applied to the cotton swab. The rubbing test was performed by varying the number of rubbings. The rubbing conditions were as follows.

Rubbing distance (one way): 1 cm

Rubbing rate: about 2 reciprocations/sec

The rubbed sample was observed and the rubbing resistance was evaluated by the number of rubbings of causing film separation according to the following criteria.

⊚: No film separation occurred even by 150 reciprocations.

○: Film separation occurred by from 100 to 150 reciprocations.

○Δ: Film separation occurred by from 50 to 100 reciprocations.

Δ: Film separation occurred by from 30 to 50 reciprocations.

×: Film separation occurred by from 10 to 30 reciprocations.

× ×: Film separation occurred by from 0 to 10 reciprocations.

(6) Evaluation of Eraser Rubbing Resistance

The sample was fixed on a glass surface with a pressure-sensitive adhesive, and an eraser "MONO" (trade name, produced by Tombo Pencil Co., Ltd.) cut out into a diameter of 8 mm and a thickness of 4 mm, which was used as the rubbing tester head, was pressed vertically on the sample surface from above under a load of 500 g/cm$^2$ and moved back and force 200 times at 25° C. and 60 RH % under the conditions such that the stroke length was 3.5 cm and the rubbing rate was 1.8 cm/sec. After removing the attached eraser, the rubbed part of the sample was confirmed with an eye. This test was repeated 3 times, and the average of the degrees of surface scratching was evaluated on the following 5-stage scale.

⊚: Scratching was not observed.

○: Scratching was scarcely observed.

Δ: Scratching was slightly observed.

×: Scratching was clearly observed.

× ×: Scratching was observed over the entire rubbed portion.

The results in the Table reveal the followings. In the hard coat film or antireflection film of the present invention comprising a silylation-treated inorganic oxide fine particle and containing 1.4 or more silyl groups per the surface area of 1 nm$^2$ of the inorganic oxide fine particle, good surface state of film is obtained. In particular, when 1.5 or more silyl groups are contained, the film surface state is more improved.

The mode of deterioration of the film surface state due to a small number of silyl groups varies depending on the layer and in the low refractive index layer (Samples 4, 6 and 7), mainly coating unevenness was generated. In the hard coat layer (Samples 14, 18, 19 and 20), a point defect was mainly generated. It is considered that since the content of the inorganic oxide fine particle for adjusting the refractive index is large in the hard coat layer (Samples 18 and 19), aggregation of fine particles readily proceeds and a point defect recognizable with an eye is generated. Also, due to size of the particle in a micron level incorporated into the hard coat layer for imparting surface irregularities or light-scattering property (Samples 14 and 21), even slight aggregation is considered to be recognizable as a point defect.

On the other hand, in the case of the inorganic oxide fine particle incorporated into the low refractive index layer (Samples 4 and 6), the content in the layer is small as compared with above and the particle has a small size of nano level. Therefore, the aggregation is not recognized as a point defect. With respect to the coating unevenness, it is considered that since the unevenness changes for the worse along with increase of the microscopic net-like aggregation of fine particles expanding over the entire surface of the low refractive index layer, slight unevenness of the coated amount produced at the coating is readily recognized as the coating unevenness when fine particles are aggregated.

Example 4

A polarizing film was produced by adsorbing iodine to polyvinyl alcohol and stretching the film, and both surfaces thereof were protected by bonding thereto a 80 µm-thick triacetyl cellulose film (TAC-TD80U, produced by Fuji Photo Film Co., Ltd.), which was dipped in an aqueous 1.5 mol/liter NaOH solution at 55° C. for 2 minutes, then neutralized and washed with water, and the (saponified) sample of Example 3 of the present invention to produce a polarizing plate. The thus-produced polarizing plate was laminated to replace the polarizing plate on the viewing side of a liquid crystal display device (having "D-BEF" produced by Sumitomo 3M Ltd., which is a polarizing separation film with a polarization selection layer, between the backlight and the liquid crystal cell) of a note-type personal computer having mounted thereon a transmissive TN liquid crystal display device, by arranging the antireflection film side to become the outermost surface. As a result, a display device with extremely reduced projection of surrounding scene and very high display quality was obtained.

Example 5

A PVA film was dipped in an aqueous solution containing 2.0 g/liter of iodine and 4.0 g/liter of potassium iodide at 25° C. for 240 seconds and further dipped in an aqueous solution containing 10 g/liter of boric acid at 25° C. for 60 seconds. Subsequently, the film was introduced into a tenter stretching machine in the mode shown in FIG. 2 of JP-A-2002-86554 and 5.3-fold stretched. Then, the tenter was bent as shown in FIG. 2 with respect to the stretching direction and thereafter, the width was kept constant. The film was dried in an atmosphere at 80° C. and removed from the tenter. The difference in the transportation speed between right and left tenter clips was less than 0.05% and the angle made by the center line of the film introduced and the center line of the film delivered to the next step was 46°. Here, |L1−L2| was 0.7 m, W was 0.7 m and a relationship of |L1−L2|=W was established. The substantial stretching direction Ax-Cx at the tenter outlet was inclined at 45° with respect to the center line 22 of the film delivered to the next step. At the tenter outlet, wrinkling and film deformation were not observed.

The film was laminated with saponified FUJITAC (cellulose triacetate, retardation value: 3.0 nm) produced by Fuji Photo Film Co., Ltd., by using a 3% aqueous solution of PVA (PVA-1171H produced by Kuraray Co., Ltd.) as the adhesive and the combined films were dried at 80° C. to obtain a polarizing plate having an effective width of 650 mm. The absorption axis direction of the obtained polarizing plate was inclined at 450 with respect to the longitudinal direction. The transmittance of this polarizing plate at 550 nm was 43.7% and the polarization degree was 99.97%. Furthermore, the polarizing plate was cut into a size of 310×233 mm, as a result, a polarizing plate having an absorption axis inclined at 45° with respect to the side could be obtained with an area efficiency of 91.5%.

Subsequently, each film of the (saponified) samples of the present invention produced in Example 3 was laminated with this polarizing plate to produce a polarizing plate with an antireflection film. Using this polarizing plate, a liquid crystal display device was produced by disposing the antireflection layer as the outermost layer, as a result, excellent contrast was obtained due to no reflection of outside light and high visibility with indistinguishable reflected image was realized.

Example 6

In a transmissive TN liquid crystal cell laminated with the sample of Example 4 of the present invention, an optical compensation film (Wide View Film Ace, produced by Fuji Photo Film Co., Ltd.) was used as the protective film on the liquid crystal cell side of the polarizing plate on the viewing side and as the protective film on the liquid crystal cell side of the polarizing plate on the backlight side, as a result, a liquid crystal display device having excellent contrast in a bright room, a very wide viewing angle in the up/down and light/left directions, remarkably excellent visibility and high display quality was obtained.

Also, samples (products with a light-diffusing layer) 15 to 17 of the present invention had a light-scattering intensity at 30° of 0.06% with respect to the outgoing angle 0° and by virtue of this light-diffusing property, the liquid crystal display device was a very good liquid crystal display with enlarged viewing angle in the down direction and improved yellow tinting in the right/left directions. In the case of comparative films produced thoroughly in the same manner as Samples 15 to 17 of the present invention except for excluding the crosslinked PEA particle and the silica particle from Coating Solutions (c-1) to (c-3) for Light-Diffusing Layer, the light-scattering intensity at 300 was substantially 0% with respect to the outgoing angle of 0° and the effect of enlarging the viewing angle in the down direction and improving the yellow tinting was not obtained at all.

Example 7

The sample of Example 3 of the present invention was laminated to a glass plate on the surface of an organic EL display device through a pressure-sensitive adhesive, as a result, a display device reduced in the reflection on the glass surface and assured of high visibility was obtained.

Example 8

A polarizing plate having an antireflection film on one surface was produced by using the sample of Example 3 of the present invention, a λ/4 plate was laminated on the polarizing plate surface opposite the side having the antireflection film, and the resulting polarizing plate was laminated to a glass plate on the surface of an organic EL display device by disposing the antireflection film side as the outermost surface, as a result, a display device assured of remarkably high visibility with the surface reflection and reflection from the inside of the surface glass being cut, was obtained.

The inorganic fine particle-containing composition is a stable composition containing an inorganic oxide fine particle, in which the dispersibility of the inorganic oxide fine particle is improved.

The optical film and antireflection film of the present invention using the composition are improved in the dispersibility of inorganic oxide fine particles without impairing the performance such as reflectance and scratch resistance, free from worsening of the film surface state due to aggregation of inorganic oxide fine particles, and assured of good production efficiency. Also, the polarizing plate using the optical film or antireflection film of the present invention has the above-described excellent performances. Furthermore, the display device equipped with the optical film or antireflection film of the present invention is reduced in the reflection of outside light and projection of surrounding scene and assured of very high visibility.

The entire disclosure of each and every foreign patent application from which the benefit of foreign priority has been claimed in the present application is incorporated herein by reference, as if fully set forth.

What is claimed is:

1. An optical, antireflection film comprising:
   a transparent support; and
   at least one optical functional layer comprising a low refractive index layer, wherein the low refractive index layer comprises a copolymer comprising a repeating unit derived from a fluorine-containing vinyl monomer and a repeating unit having a (meth)acryloyl group or a hydroxyl group in a side chain,
   wherein at least one of said at least one optical functional layer is formed by using an inorganic fine particle-containing composition comprising: a silylation-treated inorganic oxide fine particle, which comprises 1.4 or more silyl groups per a surface area of 1 nm² of the inorganic oxide fine particle, wherein the silylation-treated inorganic oxide fine particle comprises at least one oxide selected from the group consisting of silicon dioxide, tin oxide, indium oxide, zinc oxide and zirconium oxide, wherein the silylation-treated inorganic oxide fine particle is an inorganic oxide fine particle silylation-treated with a compound represented by Formula (II):

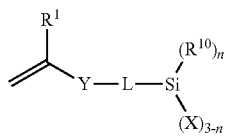

Formula (II)

wherein $R^1$ represents a hydrogen atom, a methyl group, a methoxy group, an alkoxycarbonyl group, a cyano group, a fluorine atom or a chlorine atom;

Y represents a single bond, an ester group, an amido group, an ether group or a urea group;

L represents a divalent linking chain;

n represents 0 or 1, and when a plurality of X's are present, the plurality of X's may be the same or different;

$R^{10}$ represents a substituted or unsubstituted alkyl group or a substituted or unsubstituted aryl group; and X represents a hydroxyl group or a hydrolyzable group, wherein the transparent support is a transparent film obtained from an inorganic fine particle-containing composition comprising a silylation-treated inorganic oxide fine particle, which comprises 1.4 or more silyl groups per a surface area of 1 nm² of the inorganic oxide fine particle.

2. The optical, antireflection film as claimed in claim 1, wherein said at least one optical layer further comprises at least one hard coat layer.

3. The optical, antireflection film as claimed in claim 2, wherein said at least one hard coat layer comprises an inorganic oxide fine particle having a particle diameter of 3 to 3,000 nm.

4. A polarizing plate comprising:
   a polarizer; and
   two protective films sandwiching the polarizer,
   wherein one of the two protective films is the optical, antireflection film as claimed in claim 1.

5. A display device comprising the polarizing plate as claimed in claim 4.

6. A polarizing plate comprising:
   a polarizer; and
   two protective films sandwiching the polarizer,
   wherein one of the two protective films is a transparent film and the other one of the two protective films is the optical, antireflection film of claim 1.

7. A display device comprising the optical, antireflection film as claimed in claim 1.

* * * * *